United States Patent [19]
Kirii et al.

[11] Patent Number: 5,361,615
[45] Date of Patent: Nov. 8, 1994

[54] APPARATUS FOR MEASURING BLANK HOLDING FORCE ACTING ON PRESSURE RING OF A PRESS

[75] Inventors: Kazunari Kirii, Aichi; Masahiro Shinabe, Toyota; Tsutomu Ono, Toyota; Masuo Watanabe, Toyota; Hideo Koshida, Toyota, all of Japan

[73] Assignee: Toyota Jidosha Kabushiki Kaisha, Toyota, Japan

[21] Appl. No.: 43,864

[22] Filed: Apr. 7, 1993

[30] Foreign Application Priority Data

Apr. 7, 1992 [JP] Japan ................... 4-114007

[51] Int. Cl.⁵ ............................................. B21D 24/16
[52] U.S. Cl. ........................................ 72/19; 72/350; 100/99
[58] Field of Search ............... 72/7, 19, 20, 350, 351, 72/453.13; 100/99

[56] References Cited

U.S. PATENT DOCUMENTS 3,564,883  2/1971  Koors et al. ..................... 72/19
5,138,857  8/1992  Siegert ........................... 72/19

FOREIGN PATENT DOCUMENTS 0453955  10/1991  European Pat. Off. .
63-533    3/1988   Japan ........................ 72/351
63-31320  6/1988   Japan .

Primary Examiner—Lowell A. Larson
Attorney, Agent, or Firm—Cushman, Darby & Cushman

[57] ABSTRACT

An apparatus used for measuring a holding force expected to be applied to a pressure member of a press, before the lower and upper dies and the pressure member are installed on the press. The apparatus includes a measuring member to be placed on cushion pins of the press associated with a fluid-actuated cylinder via a cushion pad. A sensing element is disposed on the measuring member or a main slide carrying the upper die, such that the holding force produced by force applying means which includes the cylinder acts on the sensing element, when the measuring member is lowered with the sensing element by the main slide in its downward movement towards a bolster on which the lower due is fixed. A load detecting device is disposed on the sensing element for detecting the holding force acting on the latter. The apparatus also includes a device for recording the holding force as detected by the load detecting device.

15 Claims, 29 Drawing Sheets

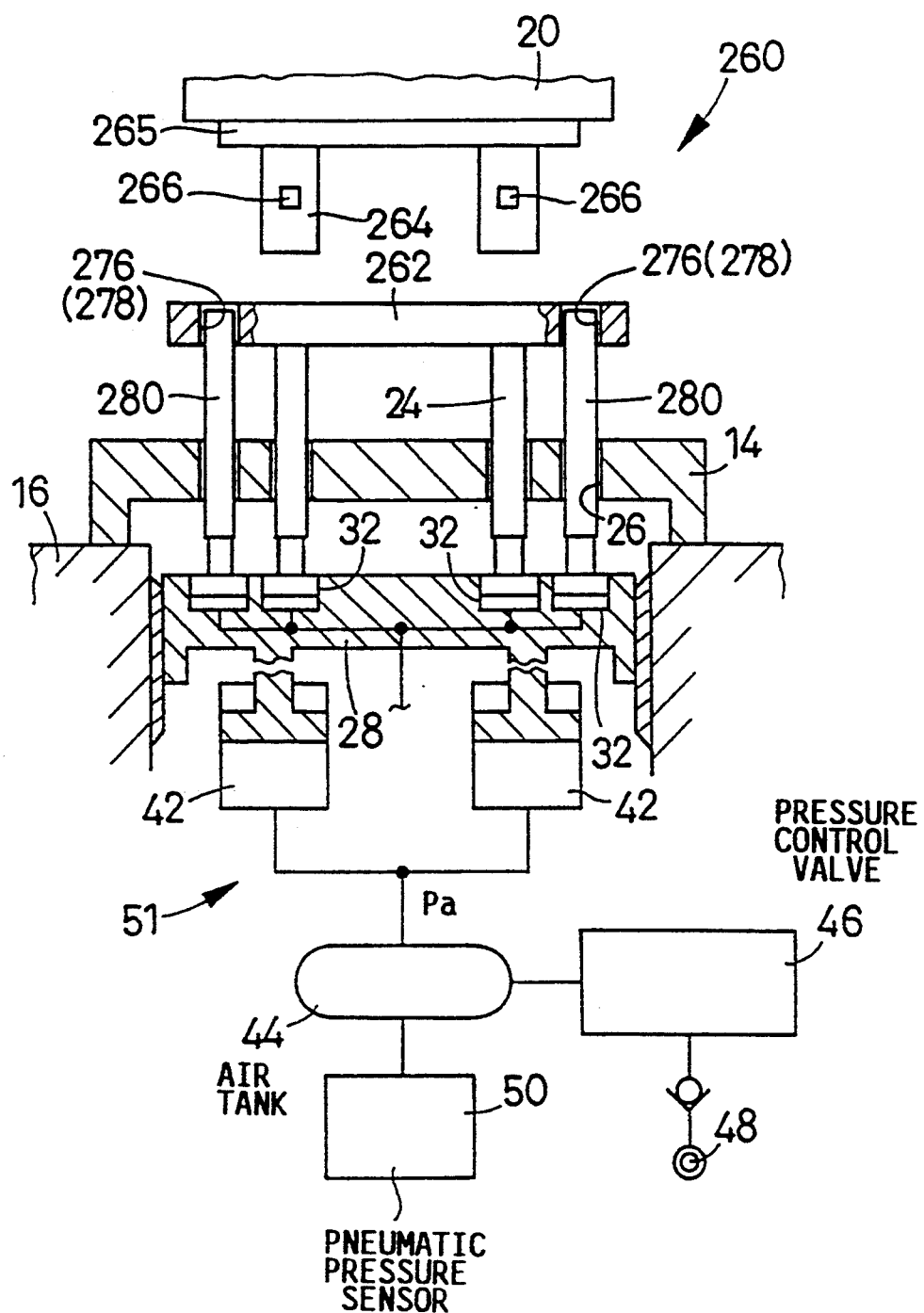

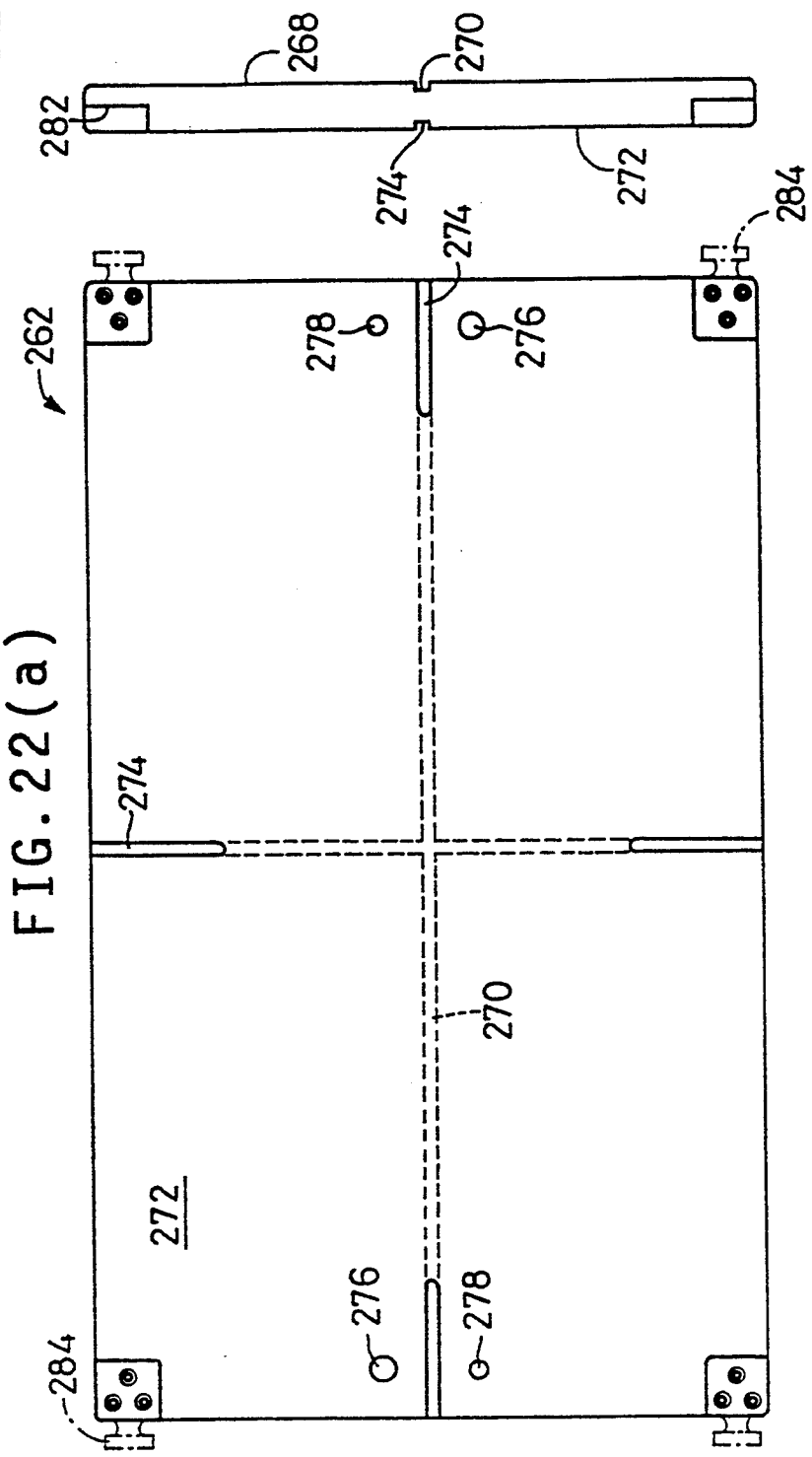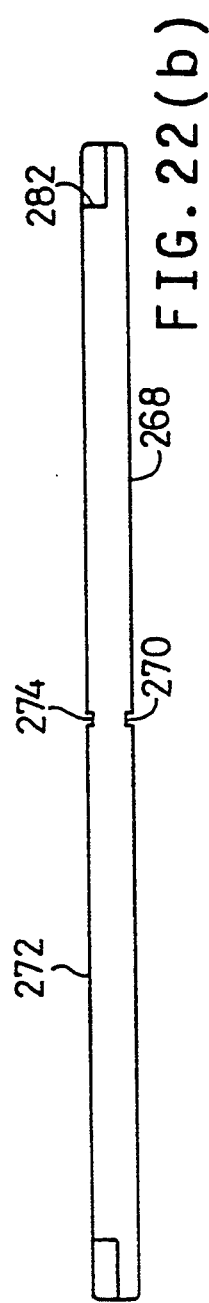

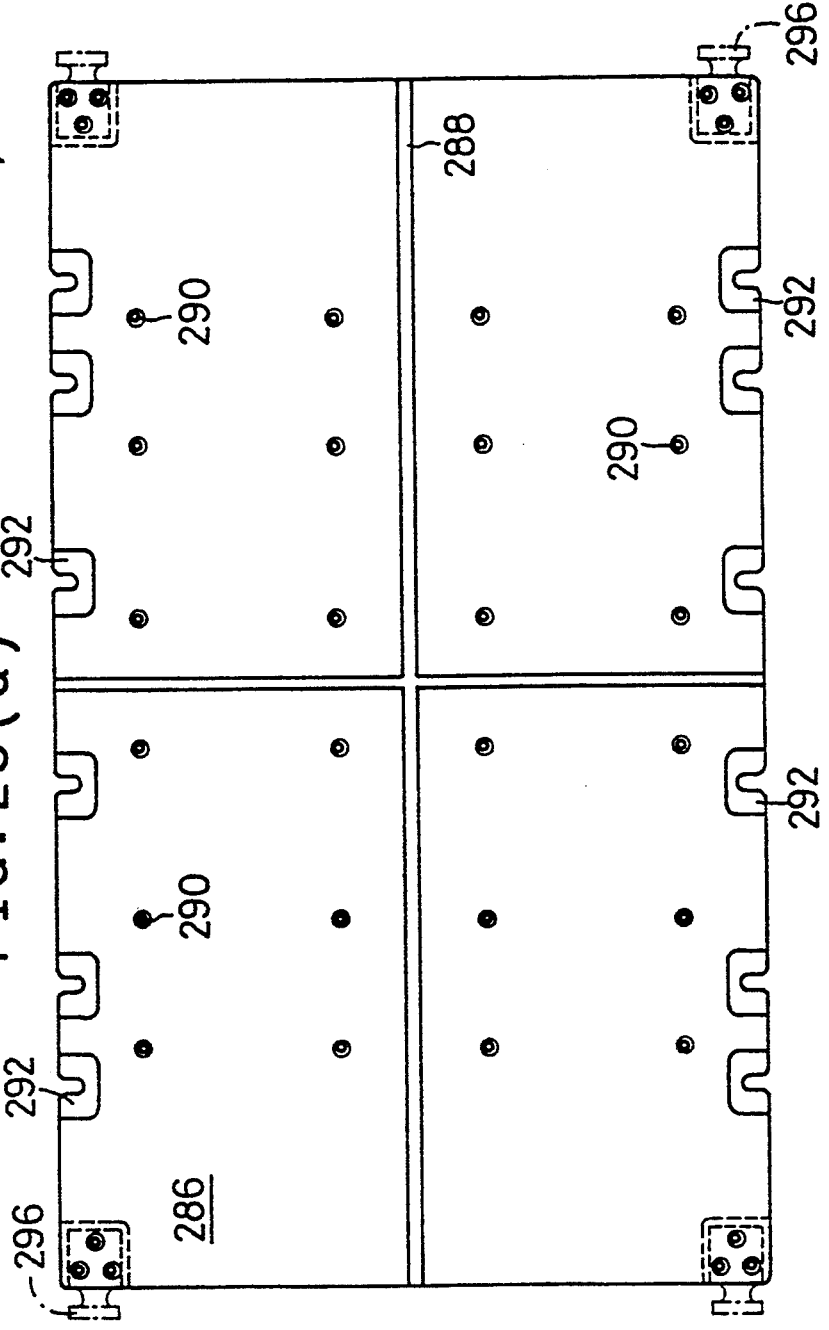

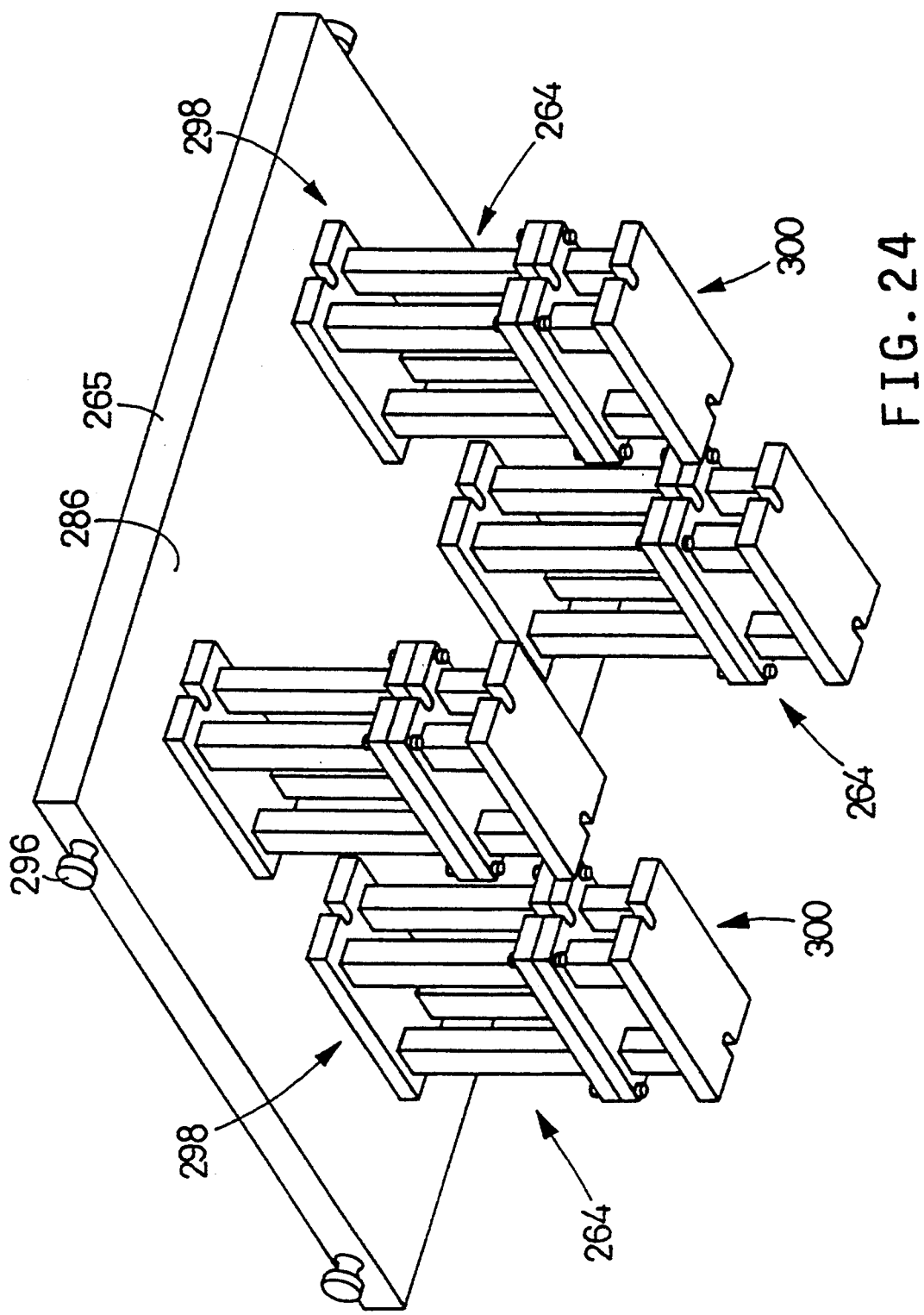

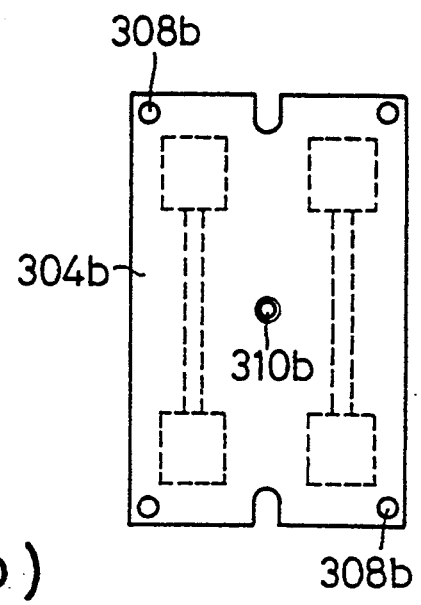
FIG. 26(a)
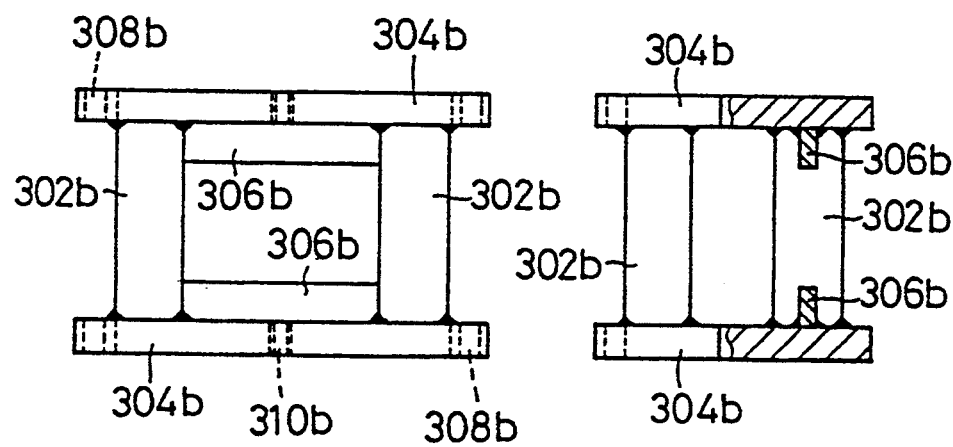
FIG. 26(b)
FIG. 26(c)

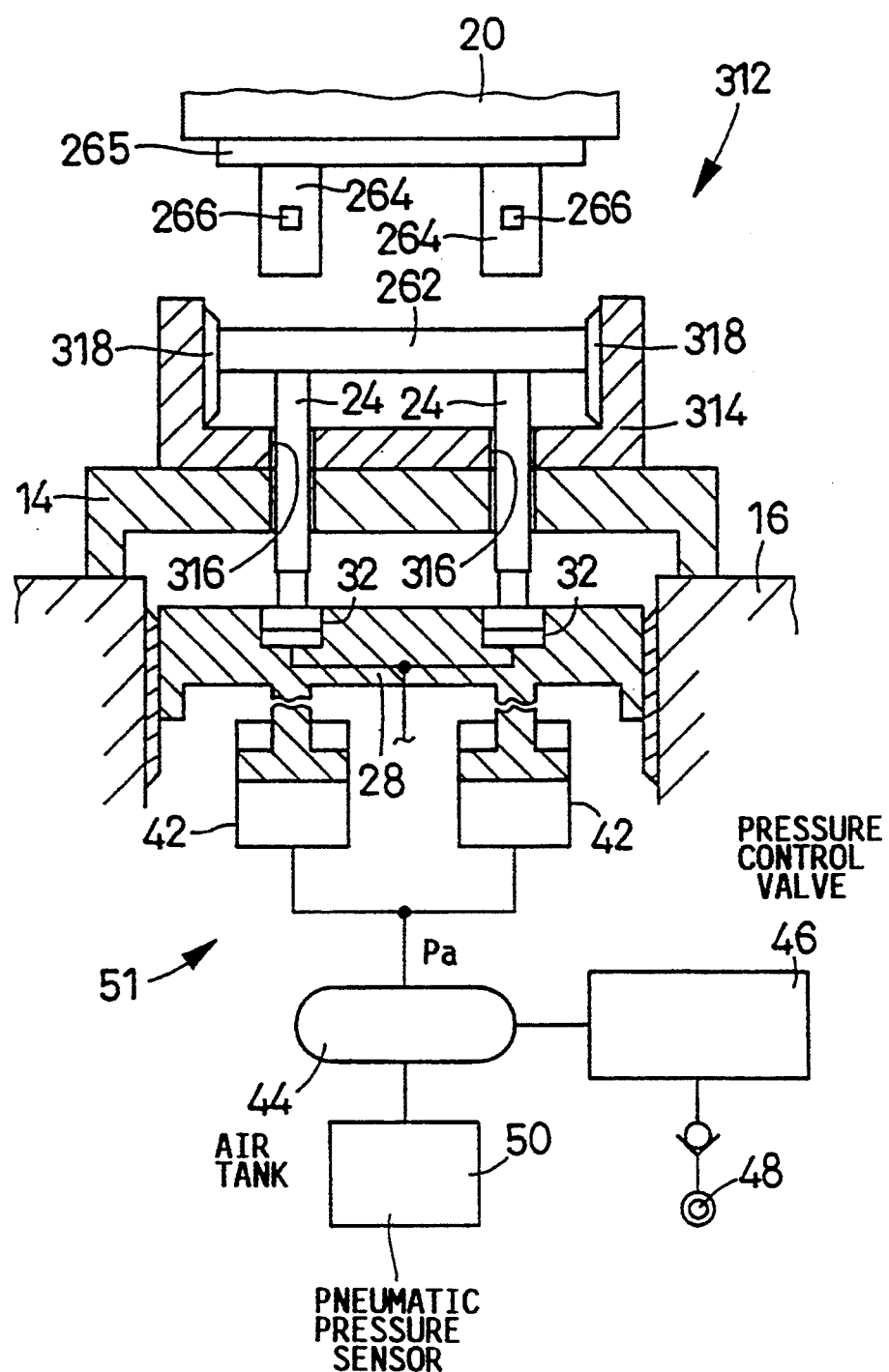

APPARATUS FOR MEASURING BLANK HOLDING FORCE ACTING ON PRESSURE RING OF A PRESS

BACKGROUND OF THE INVENTION

1. Field of the Invention

The present invention relates to an apparatus for measuring a force or load acting on a pressure member for holding a blank or workpiece in a pressing machine.

2. Discussion of the Related Art

There has been widely used a pressing machine equipped with a so-called "cushioning mechanism", which is adapted to draw a blank in the form of a metal strip or sheet. This type of pressing machine includes (a) a stationary bolster on which a lower die is fixed, (b) a movable main slide which carries an upper die fixed thereto, (c) a pressure member disposed below the main slide, (d) a plurality of cushion pins which extend through the bolster and support at their upper ends the pressure member such that the cushion pins and the pressure member are movable in the longitudinal direction of the pins, (e) a cushion pad associated with the lower ends of the cushion pins to move the cushion pins, (f) force applying means for applying a holding force to the pressure member. The force applying means has a fluid-actuated cylinder with a piston actuated by a fluid pressure for biasing the cushion pad upwards in the longitudinal direction of the cushion pins. In a drawing operation of the press, a force is transmitted to the cushion pad via the pressure member and the cushion pins, whereby the cushion pad is forced to be lowered, with a result of a retracting movement of the piston which causes an increase in the fluid pressure within the cylinder. Thus, a reaction force corresponding to the fluid pressure is applied to the pressure member so that the pressure member cooperates with the upper die to hold the metal strip under drawing. This force acting on the pressure member is hereinafter referred to as a "holding force".

An example of a press of the type discussed above is illustrated in FIG. 1, in which a drawing operation is performed by an upper die 18 and a lower die in the form of a punch 12, while a metal strip is held between a pressure member 30 in the form of a ring and the upper die 18. The press uses a fluid-actuated cylinder in the form of a pneumatic cylinder 42 for biasing a cushion pad 28 in the upward direction, by a pneumatic pressure Pa generated by the cylinder 42, so that the holding force is applied to the pressure member 30 via a plurality of cushion pins 24.

In a known pressing machine constructed as described above, the pneumatic pressure Pa is commonly adjusted or determined by a "trial-and-error" procedure conducted in trial or test operations on the specific blank to be drawn. With this procedure, the appropriate pneumatic pressure Pa which assures a drawing operation without cracking or wrinkling of the blank strip is eventually established. In this respect, it is noted that the optimum holding force suitable to permit the drawing operation as needed differs depending upon the specific die set (upper die and lower punch) and the specific pressure member. That is, different die sets are used for different blanks, and different pressure members having different weights are used with different die sets. Accordingly, the conventional procedure to determine the holding force and the pneumatic pressure Pa which assure a drawing operation on a specific blank without cracking and wrinkling requires installation of appropriate die set and pressure member on the press, and a trial drawing on the specific blank.

It is considered to replace the above manual trial-and-error procedure by an automatic procedure in which the optimum pneumatic pressure Pa for a specific blank is automatically established by suitably controlling the air pressure Pax in an air tank 44 by operating a solenoid-operated pressure control valve 46. In this case, the optimum pneumatic pressure Pax is calculated according to the following equation (1), on the basis of the following parameters: an optimum holding force Fso for assuring an adequate drawing operation on the specific blank; a weight Wr of the pressure member 30 suitable for the die set used for the blank; number n of the cushion pins 24 used with the pressure member 30; a weight Wa of the cushion pad 28; a weight of the cushion pins 24; and a pressure-receiving area Aa of the pneumatic cylinder 42. The parameters Fso, Wr and n are known from a trial or test drawing operation conducted on a test press using the relevant die set. This considered procedure eliminates the conventionally required cumbersome adjusting operation at the job site, and reduces a work load of the operator of the press, while assuring high stability in the quality of formed products, with automatic establishment of the holding force applied to the pressure member.

$$Pax = (Fso + Wa + Wr + n.WP)/Aa \tag{1}$$

In the above procedure, however, the weight Wa of the cushion pad is estimated based on the nominal weight as designed, or the weight Wa of the cushion pad is actually measured when the cushion pad is not installed on the press. Therefore, the optimum pneumatic pressure in the air tank as calculated according to the above equation does not reflect influences of a sliding resistance between the cushion pad and its guide member, and a sliding resistance of the piston of the fluid-actuated cylinder. Thus, the above procedure does not permit an effective pneumatic pressure which determines the actual holding pressure, and is not satisfactory to assure practically sufficient reliability of the automatically established holding pressure Fso, and may lead to cracking or wrinkling of the formed products. Another factor which prevents the sufficient reliability of the holding force Fso is the use of the nominal or design value of the pressure-receiving area Aa of the fluid-actuated cylinder, without taking a leakage flow of the fluid into account. The nominal pressure-receiving area Aa is different from the effective value which varies with a degree of the fluid leakage of the fluid-actuated cylinder.

Further, even assuming that the holding pressure Fso acting on the pressure member is kept at an optimum level, this does not necessarily assure that the holding pressure Fso is substantially evenly or uniformly distributed throughout the entire area of the pressure member. The uneven distribution of the holding force Fso may result in cracking or wrinkling of the formed products. This problem is encountered not only in mass production of a given product on the production press, but also in a trial or test operation on a trial press which is conducted for the purpose of determining the positions of the cushion pins. In the latter case, the uneven distribution of the holding force makes it difficult to correctly determine the positions at which the cushion pins are disposed.

SUMMARY OF THE INVENTION

It is therefore a first object of the present invention to provide an apparatus for accurately measuring the holding force which actually acts on the pressure member, which reflects influences of the sliding resistance associated with the cushion pad and the fluid leakage associated with the fluid-actuated cylinder.

It is a second object of this invention to provide an apparatus for measuring the holding force, which is capable of detecting the distribution of the force on the pressure member.

The above first object may be achieved according to one aspect of the present invention, which provides an apparatus for measuring a holding force expected to act on a pressure member for holding a blank to be drawn on a pressing machine which includes (a) a stationary bolster on which a lower die is fixed, (b) a movable main slide which carries an upper die fixed thereto and below which the pressure member is disposed, (d) a plurality of cushion pins which extend through the bolster and support at their upper ends the pressure member such that the cushion pins and the pressure member are movable in the longitudinal direction of the cushion pins, (e) a cushion pad associated with the lower ends of the cushion pins to move the cushion pins, (f) force applying means for applying the holding force to the pressure member, the force applying means having a fluid-actuated cylinder with a piston actuated by a fluid pressure for biasing the cushion pad upwards in the longitudinal direction of the cushion pins, wherein when the main slide is lowered towards the bolster, a force is transmitted to the cushion pad via the pressure member and the cushion pins, whereby the cushion pad is forced to be lowered, with a result of a retracting movement of the piston, which causes an increase in the fluid pressure within the fluid-actuated cylinder, thereby the holding force corresponding to the increased fluid pressure is applied to the pressure member, to hold the blank, the apparatus being operated to measure the holding force, before the lower and upper dies and the pressure member are installed on the pressing machine, the apparatus comprising: (i) a measuring member to be placed on the cushion pins; (ii) at least one sensing element to be disposed on one of the measuring member and the main slide, such that the holding force produced by the force applying means acts on the at least one sensing element, when the measuring member is lowered with the at least one sensing element in pressing contact with the main slide and the measuring member as the main slide is lowered towards the bolster; (iii) load detecting means provided on the at least one sensing element, for detecting the holding force acting on the at least one sensing element, to thereby detect the holding force expected to be applied to the pressure member during an operation of the pressing machine; and (iv) recording means for recording the holding force as detected by the load detecting means.

When the apparatus of the present invention constructed as described above is used to measure the holding force expected to be applied to the pressure member for holding the blank during a drawing operation on the press, the measuring member is placed on the cushion pins, and the sensing element or elements is/are disposed on the measuring member or the movable main slide. In this condition, the press is operated to lower the main slide toward the bolster. As the main slide is lowered, each sensing element is forced between the main slide and the measuring member, with a result of a downward movement of the measuring member, whereby the cushion pins on which the measuring member are placed, and the cushion pad are lowered, so that the holding force produced by the force applying means is applied to the sensing element via the cushion pad, cushion pins and measuring member. The load acting on each sensing element is detected by the load detecting means provided on the sensing element, and the detected load is recorded by the recording means. Thus, the holding force which is expected to the pressure member and the blank during operation of the press may be detected and recorded by the present apparatus, which is installed on the press before the lower and upper dies and the pressure member are installed on the press. Although the measuring member and the sensing element or elements are designed so that their total weight is equal to the weight of the pressure member to be used for the drawing operation on the blank, the holding force as detected by the present apparatus does not represent the actual holding force which acts on the pressure member during an actual pressing or drawing operation with the lower and upper dies installed.

The holding force as detected by the present apparatus is that between the main slide and the measuring member supported on the cushion pins. This means that the holding force as detected reflects influences of the sliding resistance values of the cushion pad and other components. Accordingly, the true or effective pressure-receiving area of the fluid-actuated cylinder can be accurately determined on the basis of a relationship between the holding force and the fluid pressure applied to the cylinder, which relationship can be obtained by measuring the holding force while the fluid pressure is changed. The thus determined pressure-receiving area of the cylinder reflects an influence of the fluid leakage of the cylinder. Further, the holding force detected when the fluid pressure is zero can be used to determine the total weight of the measuring member, the cushion pins, and the cushion pad supported by the cylinder. Therefore, the effective weight of the cushion pad can be calculated by subtracting the weight of the measuring member and the weight of the cushion pins from the determined total weight. The thus calculated effective weight of the cushion pad reflects the influences of the sliding resistance values of the cushion pad guide and the piston of the cylinder. It is noted that the overall resistance value may be obtained on the basis of a difference between the detected holding forces detected during the downward and upward movements of the main slide.

For accurate detection of the holding force, it is desirable to use a plurality of load sensing elements, preferably, about four sensing elements, which are disposed in an area of the press in which the blank is held by the pressure member. In this case, the holding force is equal to the sum of the load values detected by all the sensing element. Further, the second object of the invention indicated above can be achieved by this arrangement. That is, the distribution of the holding force on the pressure member (on the individual cushion pins) can be detected based on the load values detected by the individual load sensing elements. Thus, the use of two or more sensing elements makes it possible to check whether the holding force is evenly distributed on the pressure member.

Thus, the present apparatus is capable of obtaining parameters such as a relationship between the holding pressure and the fluid pressure in the fluid-actuated cylinder, a change in the holding force during downward and upward movements of the main slide, and the distribution of the holding force on the pressure member, so that the weight of the cushion pad and the pressure-receiving area of the fluid-actuated cylinder determined on the basis of these parameters reflect the influences of the sliding resistance and the fluid leakage, etc. The parameters obtained by the present apparatus may also be used for various other purposes such as diagnosis of the cylinder and pressure sensors used on the press.

As described above, the present apparatus permits accurate detection of the holding force, with the sliding resistance of the cushion pad and the fluid leakage of the cylinder taken into account. For instance, the apparatus can be used to determine the effective pressure-receiving area of the cylinder which reflects the influence of the fluid leakage, and the effective weight of the cushion pad which reflects the influence of the sliding resistance. The apparatus is also capable of diagnosing the press, on the basis of a change in the detected holding force in relation to a change in the fluid pressure of the cylinder.

The second object indicated above can be achieved according to a second aspect of this invention, which provides an apparatus for measuring a holding force expected to act on a pressure member for holding a blank to be drawn on a pressing machine which includes (a) a stationary bolster on which a lower die is fixed, (b) a movable main slide which carries an upper die fixed thereto and below which the pressure member is disposed, (d) a plurality of cushion pins which extend through the bolster and support at their upper ends the pressure member such that the cushion pins and the pressure member are movable in the longitudinal direction of the cushion pins, (e) a cushion pad associated with the lower ends of the cushion pins to move the cushion pins, (f) force applying means for applying the holding force to the pressure member, the force applying means having a fluid-actuated cylinder with a piston actuated by a fluid pressure for biasing the cushion pad upwards in the longitudinal direction of the cushion pins, wherein when the main slide is lowered towards the bolster, a force is transmitted to the cushion pad via the pressure member and the cushion pins, whereby the cushion pad is forced to be lowered, with a result of a retracting movement of the piston, which causes an increase in the fluid pressure within the fluid-actuated cylinder, thereby the holding force corresponding to the increased fluid pressure is applied to the pressure member, to hold the blank, the apparatus being operated to measure the holding force, before the lower and upper dies and the pressure member are installed on the pressing machine, the apparatus comprising: (i) a measuring member to be placed on the cushion pins, the measuring member having a plurality of projections provided on an underside thereof so that the measuring member is supported at the projections by the cushion pins and so that the holding force produced by the force applying means acts on the projections, when the cushion pins are lowered with the projections in pressing contact with the cushion pins, and with the measuring member in pressing contact with the main slide as the main slide is lowered towards the bolster; (ii) load detecting means provided on the plurality of projections, for detecting the holding force acting on the projections, to thereby detect the holding force expected to be applied to the pressure member during an operation of the pressing machine; and (Iii) recording means for recording the holding force as detected by the load detecting means.

In the apparatus constructed according to the second aspect of this invention as described above, the measuring member is placed on the cushion pins such that the projections provided on the underside of the measuring member rest on the upper ends of the corresponding cushion pins. In this condition, the main slide is lowered to lower the measuring member, together with the cushion pins in pressing contact with the projections, whereby the cushion pad is lowered so as to increase the fluid pressure in the fluid-actuated cylinder. As a result, the holding force based on the increased fluid pressure is applied to the projections on the underside of the measuring member via the cushion pad and the cushion pins. The load values detected by the load detecting means provided on the projections represent the holding force expected to be applied to the pressure member during an operation of the press. The holding force as detected by the load detecting means is recorded by the recording means.

Since the load values detected by the load detecting means are the components of the holding force which act on the individual cushion pins, it is possible to check whether the holding force produced by the force applying means is evenly or uniformly distributed on the cushion pins. In the case where the pressing machine employs hydraulic cylinders for biasing the cushion pins upwards, the detected load values which act on the individual cushion pins can be used to adjust the hydraulic pressure of the hydraulic cylinders to within an optimum range in which the holding force is substantially evenly distributed on the cushion pins. Thus, the present apparatus is effective to avoid uneven distribution of the holding force, which may arise from improper adjustment of the biasing hydraulic pressure, which may cause bottoming of some of the cushion pins. Further, the apparatus may be utilized to detect operating failure or defect of the hydraulic cylinders and improper relative length of the cushion pins. The present apparatus may be used also when the number and positions of the cushion pins are determined by a trial or test operation on a test press. Namely, the distribution of the holding force on the cushion pins installed on the test press for testing purpose can be detected by the present apparatus.

The load detecting means need not be provided on each of the projections provided on the measuring member. In other words, the load detecting means may be provided on selected ones of the projections, which are necessary to detect the distribution of the holding force. However, all the projections resting on the cushion pins may be provided with the load detecting means. In this case, the holding force may be calculated by subtracting the weight of the measuring member from the sum of the load values detected of all the projections. On the basis of the thus calculated holding force, it is possible to detect the effective pressure-receiving area of the cylinder of the force applying means which reflects the influence of the fluid leakage of the cylinder, and the effective weight of the cushion pad which reflects the influence of the sliding resistance.

The load detecting means such as strain gages may be directly attached to the cushion pins, rather than on the projections provided on the measuring member. Although this arrangement permits the load values acting on the individual cushion pins, the load detecting means must be attached to the cushion pins installed on the press, or the cushion pins used on the press should be replaced by cushion pins provided with the load detecting means. Thus, the apparatus according to the arrangement in question requires a cumbersome and time-consuming procedure.

As described above, the apparatus according to the second aspect of this invention permits measurement of the load values expected to act on the individual cushion pins, and detect the distribution of the holding force on the cushion pins. Hence, the apparatus can be used in determining the number and positions of the cushion pins depending upon the size and shape of the pressure member used on the press. Further, the apparatus can be used to diagnose the press for improper operating condition, such as bottoming of some of the cushion pins and improper hydraulic pressure of the cylinders for biasing the cushion pins, which may cause uneven distribution of the holding force on the pressure member.

BRIEF DESCRIPTION OF THE DRAWINGS

The above and optional objects, features and advantages of this invention will become more apparent by reading the following detailed description of presently preferred embodiments of the invention, when considered in connection with the accompanying drawing, in which:

FIG. 21 is a schematic elevational view partly in cross section showing a press as equipped with a second embodiment of the measuring apparatus of the present invention; FIGS. 22(a), 22(b) and 22(c) are a plan view, and a front and a side elevational view, respectively, showing a measuring member 262 used in the measuring apparatus of FIG. 21;

FIGS. 23(a), 23(b) and 23(c) are a plan view, and a front and a side elevational view, respectively, showing a holder plate 265 used in the measuring apparatus of FIG. 21;

FIG. 24 is a perspective view showing sensing elements disposed on the holder plate of FIGS. 23;

FIGS. 26(a), 26(b) and 26(c) are a plan view, and a front and a side elevational view, respectively, showing a second assembly 300 of the sensing element of FIG. 24;

FIG. 27 is a schematic elevational view partly in cross section showing a press as equipped with a third embodiment of the measuring apparatus of this invention;

DETAILED DESCRIPTION OF THE PREFERRED EMBODIMENTS

Figure 1:
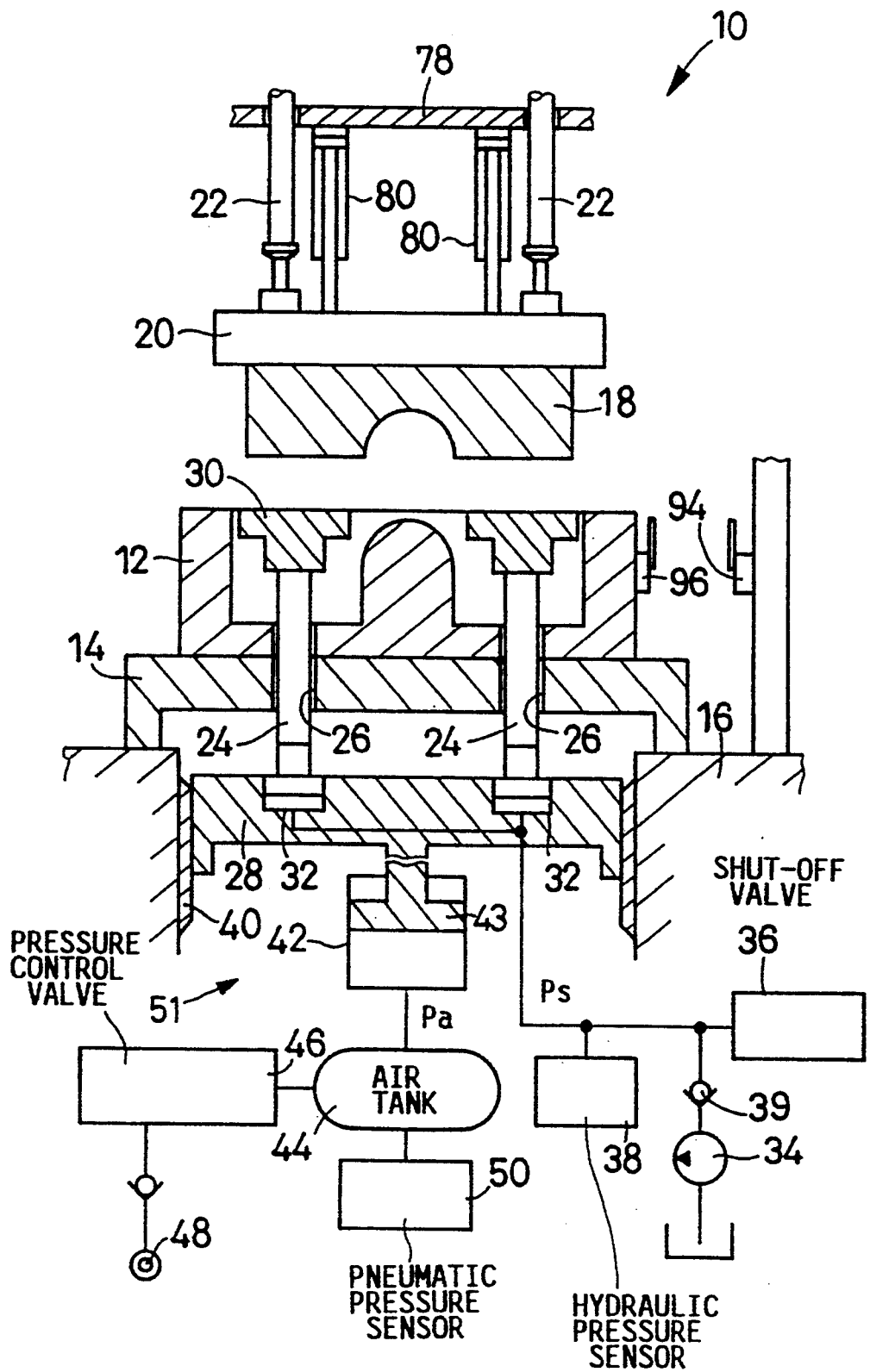
FIG. 1 is a schematic elevational view partly in cross section of a single-action press to which the present invention is applicable.

Referring first to FIG. 1, one example of a single-action press is shown generally at 10. The press 10 has a stationary bolster 14 fixedly disposed on a press bed 16, which in turn rests on a base of the press. The bolster 14 supports a lower die in the form of a punch 12 disposed thereon. The press 10 further has a movable main slide 20 which carries an upper die 18 fixed thereto. The main slide 20 is moved in the vertical direction by four plungers 22. The bolster 14 has a multiplicity of through-holes 26 through which respective cushion pins 24 extend. Located below the bolster 14 is a cushion pad 28 for supporting the cushion pins 24. The cushion pins 24 also extend through the punch 12, to support at their upper ends a pressure member in the form of a pressure ring 30 disposed around a working portion of the punch 12. The number n and positions of the cushion pins 24 are suitably determined depending upon the size and shape of the pressure ring 30, for example.

The cushion pad 28 incorporates a multiplicity of hydraulic cylinders 32 corresponding to the cushion pins 24 which extend through the respective through-holes 26 formed through the bolster 14. The lower ends of the cushion pins 24 are held in abutting contact with the pistons of the respective hydraulic cylinders 32. The pressure chambers of these cylinders 32 communicate with each other and are supplied with a pressurized working fluid delivered from an electrically operated hydraulic pump 34. Hydraulic pressure Ps within the pressure chambers of the cylinders 32 is regulated by opening and closing a solenoid-operated shut-off valve 36. The hydraulic pressure Ps is detected by a hydraulic pressure sensor 38, and adjusted so as to apply a holding force Fs to the pressure ring 30, with the force Fs substantially evenly distributed to the individual cushion pins 24.

The cushion pad 28 is guided by a guide 40 to be moved up and down in the longitudinal direction of the cushion pins 24. Normally, the cushion pad 28 is biased in the upward direction by a fluid-actuated cylinder in the form of a pneumatic cylinder 42, whose pressure chamber communicates with an air tank 44. The pressure chamber is partly defined by a piston 43 which is connected to the underside of the cushion pad 28. The air tank 44 is connected to an air source 48 (provided in a plant in which the press 10 is installed), via a solenoid-operated pressure control valve 46. Pneumatic pressure Pa within the air tank 44 and the fluid chamber of the pneumatic cylinder 42 is suitably adjusted by controlling the pressure control valve 46. The pneumatic pressure Pa is detected by a pneumatic pressure sensor 50, and is adjusted depending upon the required holding force Fs to be applied to the pressure ring 30.

The pneumatic cylinder 42 and air tank 44 constitute a major portion of force applying means 51 for applying the holding force Fs to the pressure ring 30 through the cushion pad 28 and the cushion pins 24, while the press is in a drawing operation on a blank in the form of a metal strip or sheet. Described more particularly, a force acting on the blank under drawing is applied to the cushion pad 28 via the pressure ring 30 and the cushion pins 24, whereby the cushion pad 28 is lowered, forcing down the piston 43 of the pneumatic cylinder 42. As a result, the holding force Fs corresponding to the pneumatic pressure Pa in the cylinder 42 acts on the pressure ring 30. Although only one pneumatic cylinder 42 is shown in FIG. 1, two or more pneumatic cylinders may be used as needed. In this case, all the pneumatic cylinders are connected to the common air tank 44.

Figure 3:
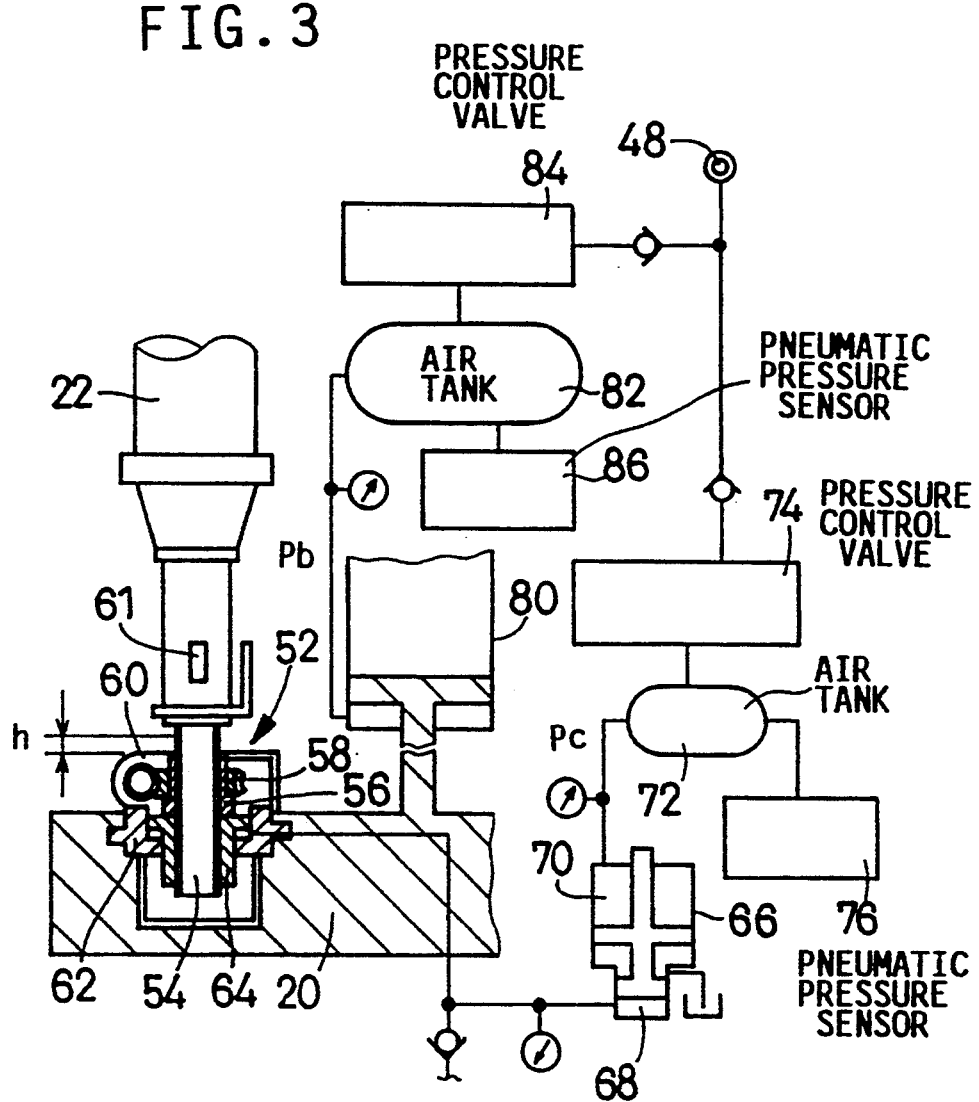
FIG. 3 is a schematic view showing a die-height adjusting mechanism, a counterbalancing cylinder and the related components of the press.
Figure 4:
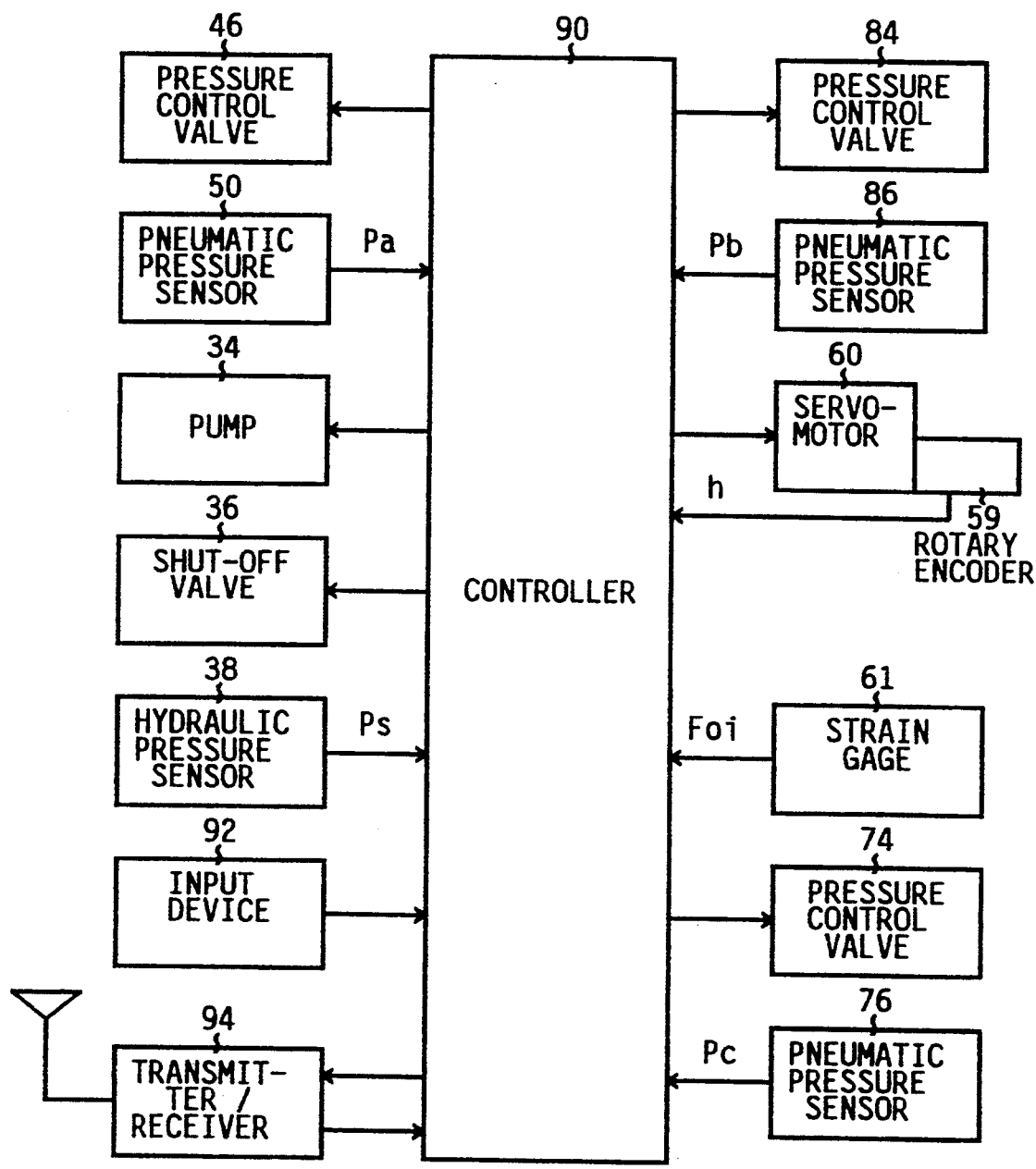
FIG. 4 is a block diagram indicating a control system for the press of FIG. 1.

As shown in FIG. 3, each of the plungers 22 is connected to the main slide 20 via a die-height adjusting mechanism indicated generally at 52 in the figure. The die-height adjusting mechanism 52 engages a threaded shaft 54 formed integrally with the corresponding plunger 22. The mechanism 52 includes a nut 56 engaging the threaded shaft 54, a worm wheel 58 fixed to the nut 56, and a servomotor 60 for rotating a worm which meshes with the worm wheel 58. The servomotor 60 is bidirectionally operated to rotate the worm wheel 58 and the nut 56 clockwise or counterclockwise, for thereby adjusting the height or the vertical position of the die-height adjusting mechanism 52 relative to the threaded shaft 54, that is, a distance h between the plunger 22 and the main slide 20, more precisely, between the lower end of the plunger 22 and the upper end of the mechanism 52. The distance h is detected by a rotary encoder 59 attached to the servomotor 60, as indicated in FIG. 4.

It will be understood that the main slide 20 is lowered away from the plunger 20 as the distance h increases, and that the position of the main slide 20 when the press 10 is at rest is shifted toward the punch 12. Accordingly, a pressing force Fp which acts on the blank when the plunger 22 is at its lower stroke end can be adjusted by changing the distance h. In other words, the distance h is adjusted for each of the four plungers 22, depending upon the desired pressing force Fp, by suitably operating the servomotor 60. As also shown in FIG. 4, each plunger 22 is provided with a strain gage 61. This gage 61 is adapted to detect a load Foi (i=1, 2, 3, 4) which acts on the corresponding plunger 22.

The main slide 20 incorporates an overload-protective hydraulic cylinder 62 which has a piston 64 connected to the die-height adjusting mechanism 52, and a housing fixed to the main slide 20. The pressure chamber of the hydraulic cylinder 62 is filled with a working fluid and communicates with an oil cheer 68 of a cylinder 66. The cylinder 66 also has an air chamber 70 which communicates with an air tank 72 connected to the above-indicated air source 48 through another solenoid-operated pressure control valve 74. Pneumatic pressure Pc within the air chamber 70 and air tank 72 is adjusted by means of the pressure control valve 74. The pneumatic pressure Pc is detected by a pneumatic pressure sensor 76, and is adjusted depending upon the pressing capacity of the press 10. That is, the pneumatic pressure Pc is determined so that when an excessive load acts on the overload-protective hydraulic cylinder 62, the piston of the cylinder 66 is moved towards the air chamber 70, so as to permit movements of the adjusting mechanism 52 and the main slide 20 towards each other, for thereby protecting the press 10 and the die set 12, 18 against damage due to an overload. The hydraulic cylinder 62, cylinder 66, air tank 72 and the related components are provided for each of the four plungers 22 associated with the respective mechanisms 52, and the pneumatic pressure Pc in each of the four air tanks 72 is suitably controlled.

The main slide 20 is also connected to four counterbalancing pneumatic cylinders 80 attached to a frame 78 (indicated at the top of FIG. 1) of the press 10. Each pneumatic cylinder 80 has a pressure chamber communicating with an air tank 82, which is also connected to the air source 48 via a solenoid-operated pressure control valve 84. By controlling the valve 84, pneumatic pressure Pb within the pressure chamber of the cylinder 80 and the air tank 82 can be regulated. The pressure Pb is detected by a pneumatic pressure sensor 86, and is adjusted so that the force corresponding to the pressure Pb counterbalances with the total weight of the main slide 20 and upper die 18. The pressure chambers of the four counterbalancing pneumatic cylinders 80 communicate with the common air tank 82.

The press 10 uses a controller 90 as shown in FIG. 4. The controller 90 is adapted to receive output signals of the pneumatic pressure sensors 50, 86, 76, hydraulic pressure sensor 38, rotary encoder 59 and strain gage 61, which are indicative of the pneumatic pressures Pa, Pb, Pc, hydraulic pressure Ps, distance h and pressing force Foi, respectively. The controller 90 is constituted by a microcomputer, which incorporates a central processing unit (CPU), a random-access memory (RAM), a read-only memory (ROM), an input/output interface circuit, and an analog-digital converter. The CPU operates to process various signals according to control programs stored in the ROM, while utilizing a temporary data storage function of the RAM, so as to control the pressure control valves 46, 84, 74 and shut-off valve 36, and apply drive signals to the pump 34 and servomotor 60. Although FIG. 4 shows only one piece, for the servomotor 60, strain gage 61, pressure control valve 74 and pneumatic pressure sensor 76, the controller 90 is operated to control all of the four pieces provided on the press 10, as described above with respect to the above-indicated four components. The controller 90 is also adapted to receive data from a data input device 92 in the form of a keyboard or personal computer, for example, and is connected to a transmitter/receiver (transceiver) 94. The data received from the data input device include information indicative of the specifications of the press 10. The controller 90 also receive from the transmitter/receiver 94 data indicative of the specifications of the die set 12, 18. To this end, each punch 12 carries an ID card 96 attached thereto, as shown in FIG. 1. The ID card 96 stores the information indicative of the specifications of the die set 12, 18, and has a built-in battery and a data transmitting function. The transmitter/receiver 94 is disposed so as to face the ID card 96, as also shown in FIG. 1, and transmits a signal to the ID card 96, to request transmission of the appropriate information on the die set 12, 18, 30. The transmitter/receiver 94 which receives the information from the ID card 96 transmits the information to the controller 90.

The data indicative of the specifications of the press 10 and the die set 12, 18, 30 are necessary to determine the pneumatic pressure values Pa, Pb, hydraulic pressure Ps, and distance h, which are optimum for effecting a drawing operation under the best conditions. The data received by the controller 90 include the following information, for example. It is noted that the information on the die set also includes data indicative of the specific die set used, which differs depending on the product to be obtained, a model of a car for which the product is used, a type of press on which the die set is used, and a process in which the product is produced.

MACHINE INFORMATION
Weight Wa of the cushion pad 28
Average weight Wp of the cushion pins 24
Weight Ws of main slide
Pressure-receiving area Aa of the pneumatic cylinder 42
Total pressure-receiving area Ab of the four pneumatic cylinders 80
Average pressure-receiving area As of the hydraulic cylinders 32
Modulus K of elasticity of volume of the working fluid used for the hydraulic cylinder 32
Mean travel Xav of the pistons of the hydraulic cylinders 32
Total volume V of the fluid in the hydraulic circuit of the hydraulic cylinders 32
Provisional h-Fpi characteristic relationship (Fpi=a.h)
DIE SET INFORMATION
Weight Wr of the pressure ring 30
Weight Wu of the upper die 18
Holding force Fso
Pressing force Fpoi of each cushion pin 24
Number n of the cushion pins 24

Figure 2:
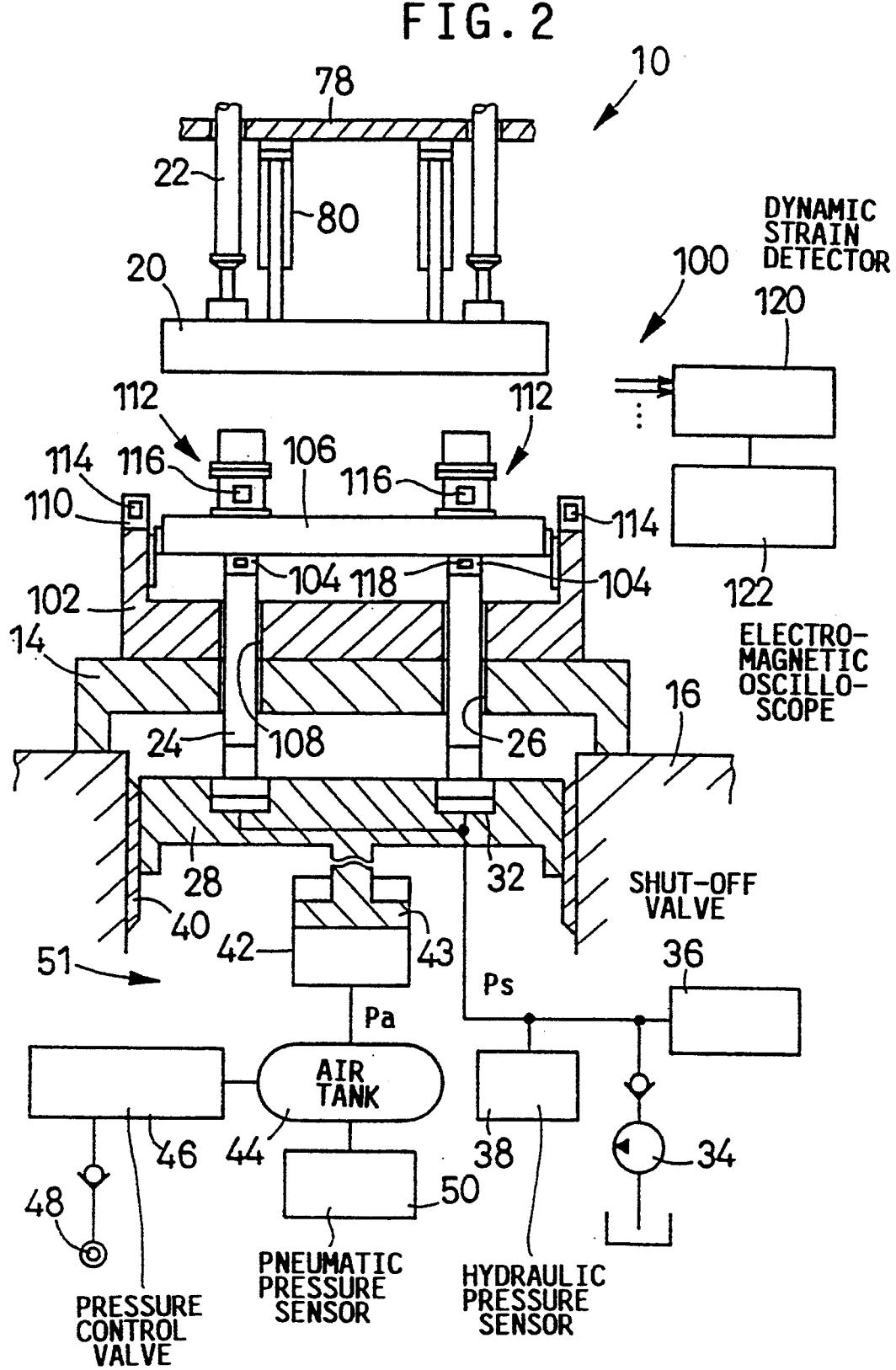
FIG. 2 is a schematic view of the press of FIG. 1 as equipped with an apparatus for measuring the holding force acting on the pressure ring, which is constructed according to one embodiment of the present invention.

The weight Wa of the cushion pad 28 is the actual weight of the pad 28 minus the sliding resistance applied to the pad 28. This weight value Wa can be obtained by a load measuring apparatus 100 installed on the press 10, as shown in FIG. 2. Described in detail, the weight value Wa is obtained from a Fs-Pa characteristic curve, which is obtained by measuring the holding force Fs while the pneumatic pressure Pa is changed before actual drawing operation of the press 10.

As shown in FIG. 2, the load measuring apparatus 100, which is constructed according to one embodiment of the present invention, has a positioning member 102 of rectangular box construction fixed on the bolster 14, and a measuring member 106 accommodated within the positioning member 102. The measuring member 106 is movable in the vertical direction, and has a plurality of sensing pins 104 protruding from the underside thereof. The sensing pins 104 correspond to the cushion pins 24. The positioning member 102 has a plurality of apertures 108 through which the respective cushion pins 24 extend. The measuring member 106 rests on the cushion pins 24 extending through the through-holes 26 and the apertures 108, such that the sensing pins 104 are held in abutting contact with the corresponding upper ends of the cushion pins 24. The positioning member 102 also has four sensing posts 110 projecting upwards at the four corners of the rectangular box. On the other hand, the measuring member 106 has four sensing elements 112 projecting upwards from the upper surface, near the four corner portions of an area in which a drawing operation is effected. The four sensing posts 110 and the four sensing elements 112 are provided with respective sets of strain gages 114, 116. Suitably selected ones of the sensing pins 104 indicated above are provided with respective sets of strain gages 118. The strain gages 114, 116, 118 are connected to a dynamic strain detector 120, which is connected to an electromagnetic oscilloscope 122, so that waveforms of loads detected by the strain gages 114, 116, 118 are recorded on a photosensitive recording medium by the oscilloscope 122. The dynamic strain detector 120 has a function of an amplifier, and is capable of adjusting a zero point thereof. The oscilloscope 122 is capable of recording, with high response, the load values which vary as the main slide 20 is moved up and down.

The strain gages 114, 116, 118 function as means for detecting the holding force expected to be applied to the pressure ring 30. Each set of strain gages 114, 116, 118 consists of four strain gages attached to each sensing post 110, sensing element 112 or pin 104, at respective four side surface portions of the latter. The four strain gages of each set are connected to each other so as to form a bridge circuit. The sensing pins 104 serve as sensing projections provided on the underside of the measuring member 106, so that the load measuring apparatus 100 measures the load acting on these projections, prior to the installation of the punch 12, upper die 18 and pressure ring 30 on the press 10, to detect the holding force expected to be applied to the pressure ring 30 during a drawing operation after the punch 12 and the pressure ring 30 are installed on the press 10.

To measure the holding force and the pressing force expected to be generated on the single-action press 10, the positioning member 102 and the measuring member 106 are installed on the press 10, without the punch 12, pressure ring 30 and upper die 18 installed on the press 10. For the measurement, the main slide 20 is lowered to its lower stroke end. During this downward movement of the main slide 20, the lower surface of the main slide 20 is brought into contact with the sensing elements 112 on the measuring member 106, whereby the measuring member 106 is lowered against the biasing force of the pneumatic cylinder 42. The loads acting on the four sensing elements 112 during this downward movement of the measuring member 106 are detected by the strain gages 116. Before the main slide 20 has reached its lower stroke end, the measuring member 106 comes into abutting contact with the positioning member 102. At this time, the loads detected by the strain gages 116 suddenly rise, due to rigidity of the structure of the press 10. The heights of the sensing elements 112 from the upper surface of the measuring member 106 are determined or adjusted so that the measuring member 106 abuts on the positioning member 102 shortly before the main slide 20 has reached the lower stroke end. For substantially equal distribution of the force on the four sensing elements 112, the heights of these elements 112 are accurately adjusted as needed by using height adjusting shims, for example.

Figure 6:
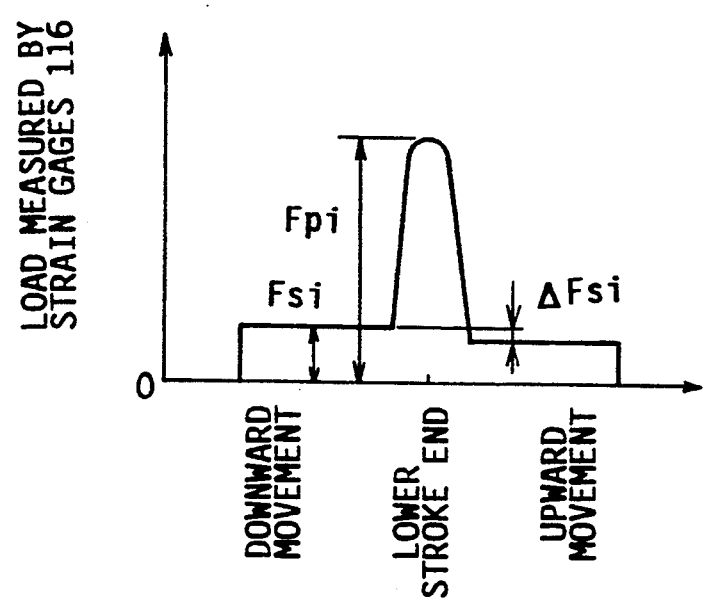
FIG. 6 is a graph showing an example of a waveform of the load detected by strain gages 116 used in the measuring apparatus of FIG. 2.

The graph of FIG. 6 indicates a variation in the load detected by the strain gages 116 provided on one of the four sensing elements 112. In the graph, a load value Fsi corresponds to the holding force expected to be applied to the pressure ring 30, and a load value Fpi corresponds to the pressing force expected to be applied to the die set 12, 18. To detect the load value Fpi, the positioning member 102 and the measuring member 106 are designed to have higher rigidity than the punch 12 and upper die 18 which are used for an actual drawing operation.

Figure 7:
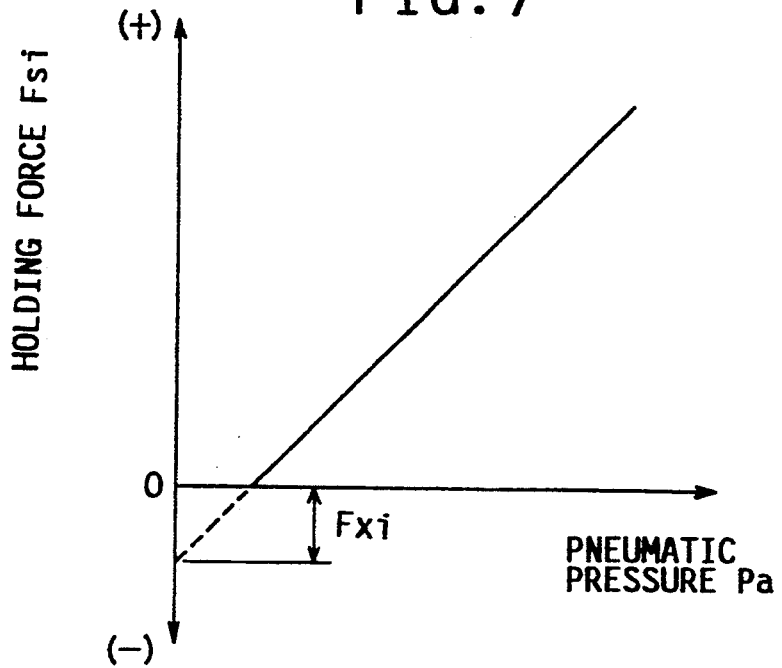
FIG. 7 is a graph indicating a relationship between the holding force Fsi obtained from the load detection of FIG. 6 and a pneumatic pressure Pa.

The graph of FIG. 7 indicates a relationship between the pneumatic pressure Pa of the pneumatic cylinder 42 and the load value Fsi (corresponding to the holding pressure), which was obtained by measuring the load value Fsi while the pneumatic pressure Pa was continuously changed. The weight Wa of the cushion pad 28 is calculated on the basis of a load value Fxi which can be obtained from the Pa-Fsi relationship. Described more specifically, the weight Wa is calculated by subtracting the total weight of the measuring member 106 (including the weight of the sensing pins 104 and elements 112) and the cushion pins 24, from a total load value Fx of the load values Fxi (i=1, 2, 3, 4) of the four sensing elements 112. Alternatively, the weight Wa can be obtained from a relationship between the pneumatic pressure Pa and a total load value Fs of the detected load values Fsi of the four sensing elements 112. The thus obtained weight Wa is different from and smaller than the actual weight of the cushion pad 28, by an amount which is determined by various parameters such as the sliding resistance values of the guide 40 and piston 43, a degree of the air leakage of the pneumatic cylinder 42 and a detecting error of the pneumatic pressure sensor 50. Accordingly, the obtained weight Wa is specific to the particular condition of the press 10 on which the measuring apparatus 100 was operated. As indicated above, the weight Wa is used as one item of the machine specifications. However, this item Wa may be replaced by two items, i.e., an actual weight of the cushion pad 28, and a sliding resistance value which can be obtained on the basis of a difference ΔFsi between the load values Fsi and Fpi shown in the graph of FIG. 6.

In the case where the strain gages 118 are provided on all of the sensing pins 104 provided on the underside of the measuring member 106, the holding force can be obtained by subtracting the total weight of the measuring member 106 and the sensing elements 112, from the total load value detected by the strain gages 118.

The weight Wp is an average value of the weights of the cushion pins 24 used on the press 10. The weight Ws is equal to the actual weight of the main slide 20 minus a sliding resistance value of the slide 20 with respect to a guide therefor. To obtain the weight Ws, the load values Foi are detected by the respective strain gages 61 during the downward movement of the main slide 20. The total load value Fo of the four load values Foi of the four plungers 22 is detected while the pneumatic pressure Pb of the pneumatic cylinder 80 is continuously changed. Like the weight Wa of the cushion pad 28, the weight Ws of the main slide 20 can be obtained from the obtained characteristic relationship between the total load Fo and the pneumatic pressure Pb. The weight Ws may be replaced by the actual weight of the main slide 20, and the sliding resistance value.

The pressure-receiving area Aa of the pneumatic cylinder 42 is a value which reflects an influence of the air leakage of the cylinder 42. For instance, the area Aa corresponds to a gradient of a line which represents the relationship between the holding force Fs (total load value Fsi) and the pneumatic pressure Pa. When a plurality of pneumatic cylinders 42 are provided, the area As is a total pressure-receiving area of all the cylinders 42. Like the pressure-receiving area As, the total pressure-receiving area Ab of the four pneumatic cylinders 80 can be obtained from the Fo-Pb characteristic relationship. The average pressure-receiving area As of the hydraulic cylinders 32 can be obtained from a characteristic relationship between the holding force Fs, and the hydraulic pressure Ps which is detected by the hydraulic pressure sensor 38 when the Fsi-Pa characteristic relationship of FIG. 7 is obtained, for example.

The modulus K of elasticity of volume of the working fluid is determined depending upon the specific property of the oil used. The mean travel Xav of the pistons of the hydraulic cylinders 32 is an average value of travel distances of the pistons of the cylinders 32 from the upper stroke ends, when the main slide 20 has reached its lower stroke end. The travel distances are determined so as to apply the holding force to the pressure ring 30 evenly through all of the cushion pins 24 in abutting contact with the ring 30. Described more particularly, the travel distances are determined so that all of the pistons of the cylinders 32 are lowered from their upper stroke ends by the respective cushion pins 24 while none of the pistons are bottomed or lowered to their lower stroke ends by the cushion pins 24, upon reaching of the main slide 20 to its lower stroke end, even in the presence of a variation in the length of the cushion pins 24 and an inclination of the cushion pad 28. The travel distances can be obtained by an experiment, or on the basis of the measured length variation of the cushion pins 24 and maximum strokes of the pistons of the cylinders 32. The volume V is a total volume of the working fluid existing in a portion of the hydraulic circuit associated with the hydraulic cylinders 32, which portion includes the pressure chambers of the cylinders 32 and is bounded by a check valve 39 (FIG. 1). The volume V is a value when the pistons of the cylinders 32 are at their upper stroke ends.

The provisional h-Fpi characteristic relationship (i=1, 2, 3, 4) is a relationship (Fpi=a.h) between the distance h and the pressing force Fpi when the plungers 22 have reached the lower stroke ends. This relationship is obtained by measuring the pressing force values Fpi (when the plungers 22 have reached the lower stroke ends), with different values of the distance h. Since the value Fpi differs depending upon the rigidity of the die set 12, 18, suitable members having considerably higher rigidity than the die set are used for the measurement. The obtained provisional h-Fpi relationship reflects the rigidity of the press 10 (except for the die set). It is noted that the measurement is effected after the pneumatic pressure Pb of the pneumatic cylinders 80 is adjusted so that the lifting force produced by the cylinders 80 counterbalances the total weight of the main slide 20 and the upper die 18.

Figure 8:
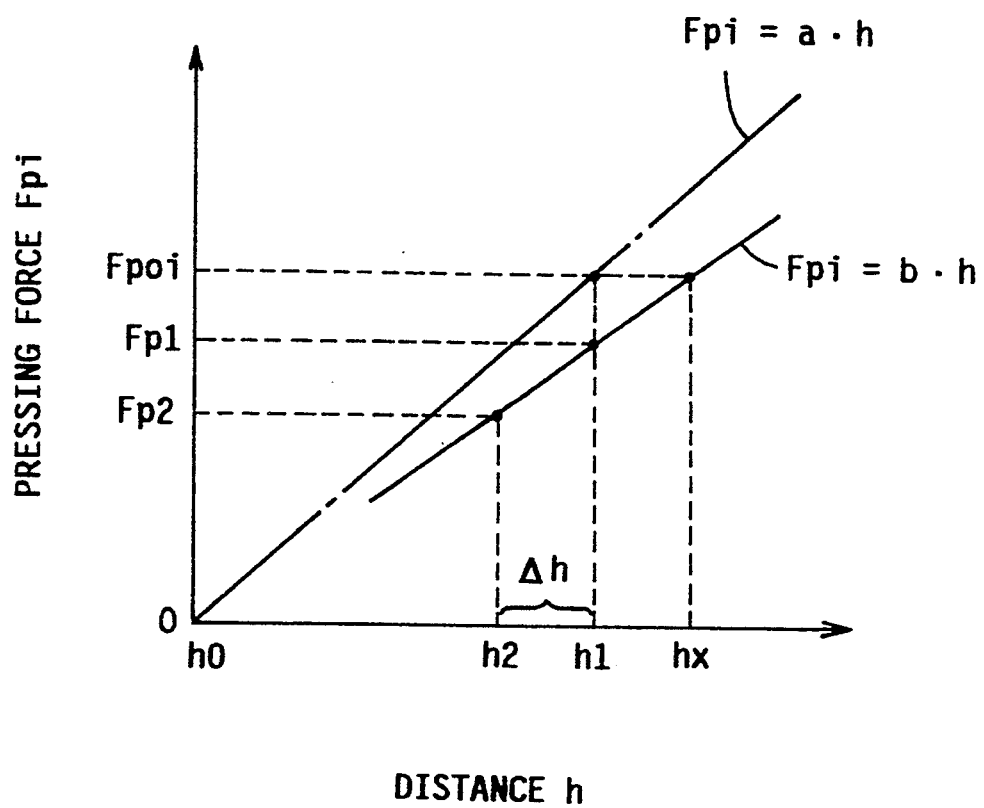
FIG. 8 is a graph indicating a pressing force Fpi of the press and a distance h as indicated in FIG. 3.

An example of the provisional h-Fpi characteristic relationship is indicted by one-dot chain line in the graph of FIG. 8, wherein the maximum value h0 of the distance h when the pressing force Fpi is zero is used as a reference. This h-Fpi characteristic relationship is obtained for each of the four plungers 22 (four die-height adjusting mechanisms 52). The overall pressing force Fp is a sum of the pressing forces Fpi of the individual plungers 22. The provisional h-Fpi characteristic relationship may be obtained from the load values Fpi shown in FIG. 6, by using the load measuring apparatus 100.

There will next be described the individual items of the information on the die set 12, 18, 30.

The weight Wr of the pressure ring 30 and the weight Wu of the upper die 18 are the values actually measured of the ring 30 and die 18 as manufactured. The holding force Fso and the pressing force Fpoi (i=1, 2, 3, 4) are obtained by a trial-and-error procedure, in which the optimum forces Fso and Fpoi suitable for performing a desired drawing operation are determined by test operations on a trial press on which the pressure ring 20, upper die 18 and punch 12 are installed. The holding force Fso and pressing force Fpoi do not include components due to the influences by the weights of the die set 12, 18, 30 and the sliding resistance values of the associated components. In the case where the trial press is similar to that shown in FIGS. 1 and 3, for example, the pneumatic pressure Pb is adjusted so that the main slide 20 is lowered by the plungers 22 while the total weight of the slide 20 and the upper die 18 is counterbalanced by the lifting force produced by the cylinders 80. The load values Foi are detected by the strain gages 61 during a trial drawing operation effected in the above condition. The holding force Fso and pressing force Fpoi can be obtained on the basis of the detected load values Foi. While the holding force Fso is a total force applied to the pressure ring 30 through the cushion pins 24, the pressing force Fpoi is a force produced by each of the four plungers 22, and the total pressing force Fp is a sum of the forces Fpoi of the four plungers 22.

Figure 9:
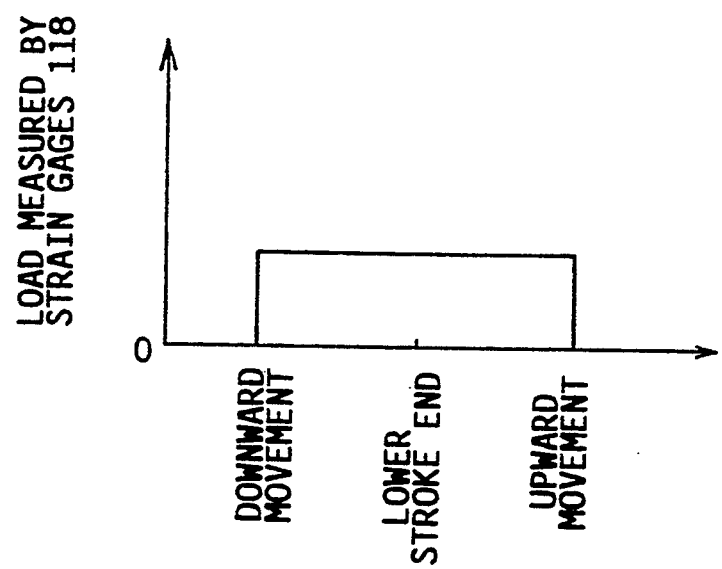
FIG. 9 is a graph showing an example of a waveform of the load detected by strain gages 118 used in the measuring apparatus of FIG. 2.

The number n of the cushion pins 24 is determined by an experiment, depending upon the size and shape of the pressure ring 30, so as to draw a blank into a desired product. In determining the number n, it is desirable to take into account the distribution of the holding force on the individual cushion pins 24. The distribution can be detected by the load measuring apparatus 100. Namely, the apparatus 100 is installed on a trial press equipped with the cushion pins 24 which are positioned depending upon the specific pressure ring 30 used. The load values acting on the four sensing elements 112 are detected by the strain gages 116, and the detected load values are examined to determine whether the holding force applied to the pressure ring 30 are evenly distributed on the cushion pins 24. The distribution of the holding force can also be examined on the basis of the load values detected by the strain gages 118 provided on the sensing pins 104. For instance, if the holding force is unevenly distributed on the cushion pins 24 due to bottoming of the pistons of some of the hydraulic cylinders 32, excessive forces act on the cushion pins 24 corresponding to the bottomed pistons. Thus, the imbalance or uneven distribution of the holding force can be detected by the strain gages 118. More specifically, as the measuring member 106 is lowered with the sensing elements 112 forced down by the lowering main slide 20, the cushion pins 24 are lowered pushing down the corresponding pistons of the hydraulic cylinders 32, until the force produced by the hydraulic pressure Ps is counterbalanced by the biasing force produced by the pneumatic cylinder 42. In this condition, the cushion pad 28 is lowered against the biasing force of the pneumatic cylinder 42. Accordingly, the load values detected by the strain gages 118 remain substantially constant throughout the entire operating stroke of the main slide 20, irrespective of the length variation of the cushion pins 24. The graph of FIG. 9 shows the load value detected by the strain gages 118 provided on one of the sensing pins 104. If the holding force is not evenly distributed on the pressure ring 30, the the pistons of some of the hydraulic cylinders 32 are bottomed, whereby the load values detected by the strain gages 118 on the sensing pins 104 corresponding to the bottomed pistons are considerably increased as compared with those detected by the strain gages 118 on the other sensing pins 104. Thus, the even or uneven distribution of the holding force can be found or detected by the load measuring apparatus 100 operated in a trial operation.

Figure 5:
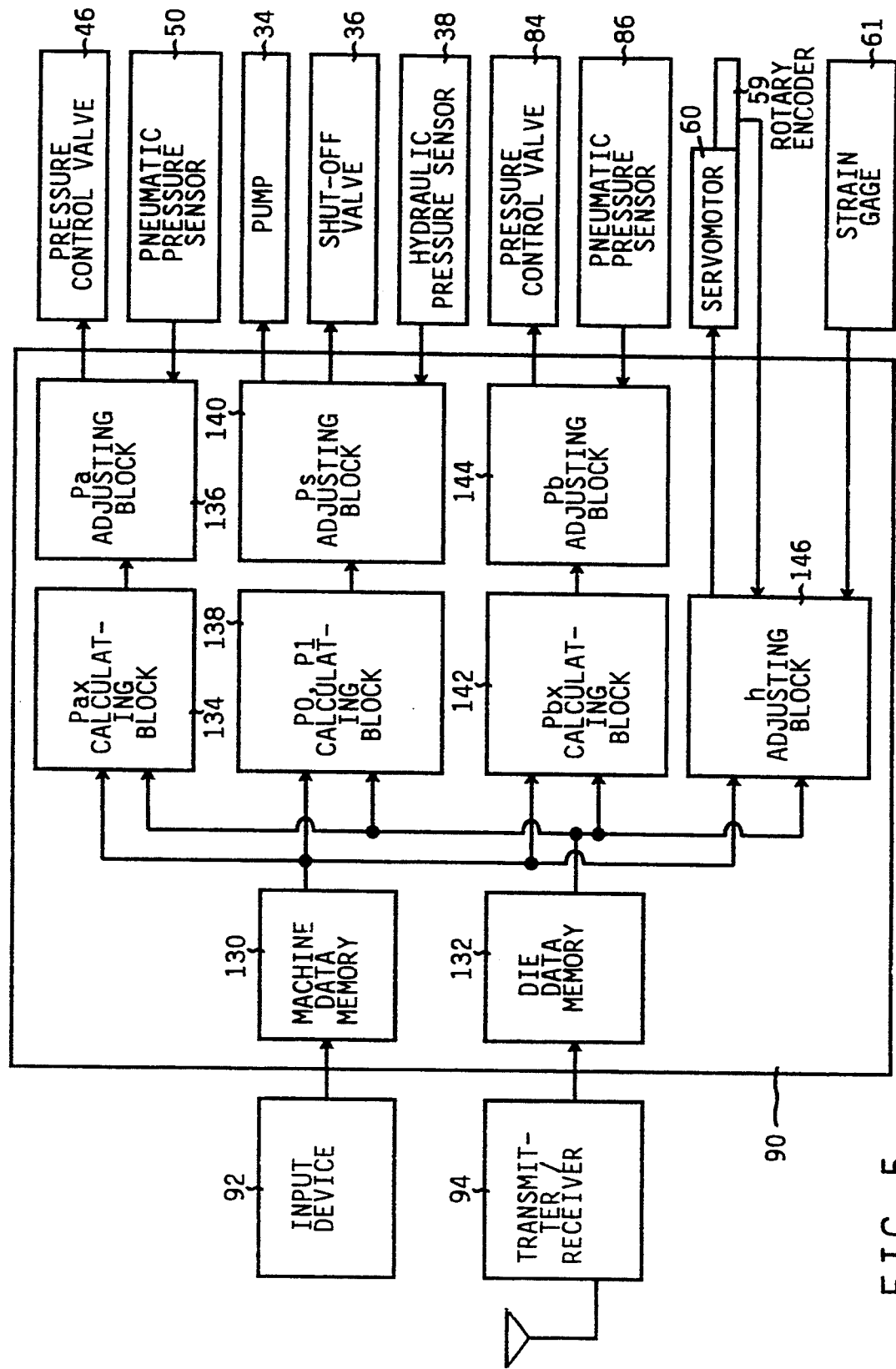
FIG. 5 is a block diagram for explaining the functions of a controller of the control system of FIG. 4.

Referring back to FIG. 4, the controller 90 is adapted to achieve various functions as illustrated in the block diagram of FIG. 5, according to the control programs stored in the ROM. The controller 90 includes a machine data memory 130 for storing data including the machine information entered through the data input device 92. The controller 90 further includes a die data memory 132 for storing the data including the die set information which is read from the ID card 96 and transmitted by the transmitter/receiver 94 when the punch 12 is installed on the press 10.

The block diagram of FIG. 5 shows various functional blocks which correspond to respective means for performing the corresponding functions. A Pax calculating block 134 is for calculating the pneumatic pressure Pax for producing the holding force Fso, according to the following equation (2), on the basis of the machine information stored in the machine data memory 130 and the die set information stored in the die data memory 132. The holding force Fso to be produced is represented by the die set information:

$$Pax = (Fso + Wa + Wr + n \cdot Wp)/Aa \qquad (2)$$

A Pa adjusting block 136 is for controlling the solenoid-operated pressure control valve 46 so that the pneumatic pressure Pa in the air tank 44 detected by the pneumatic pressure sensor 50 coincides with the pneumatic force Pax calculated by the Pax calculating block 134. With the pneumatic pressure Pa thus established, the holding pressure Fso specified by the die information is applied to the pressure ring 30. The pneumatic pressure Pax may be calculated, with suitable compensation for a change in the volume of the pressure chamber of the pneumatic cylinder 42 due to a lowering movement of the cushion pad 28. In this respect, however, since the capacity of the air tank 44 is sufficiently large, the amount of change in the pneumatic pressure Pa due to the change in the volume of the pressure chamber of the cylinder 42 is so small and negligible.

A P0, P1 calculating block 138 is for calculating an initial hydraulic pressure P0 and a target hydraulic pressure P1 according to the following equations (3) and (4), respectively, on the basis of the machine information in the machine data memory 130 and the die set information in the die data memory 132.

$$Xav = (Fso - n.As.P0)V/n^2.As^2.K \qquad (3)$$

$$Fso + Wr + n.Wp = n.As.P1 \qquad (4)$$

The initial hydraulic pressure P0 is a pressure for applying the holding force Fso to the pressure ring 30 substantially equally through the cushion pins 24, when the upper die 18 is not in contact with the pressure ring 30. On the other hand, the target hydraulic pressure P1 is a similar pressure when the upper die 18 is in pressing contact with the pressure ring 30.

A Ps adjusting block 140 is for controlling the pump 34 and shut-off valve 36, so that the initial value of the hydraulic pressure Ps detected by the hydraulic pressure sensor 38 is equal to the calculated initial hydraulic pressure P0 indicated above. With the hydraulic pressure Ps thus adjusted to the initial value P0, it is theoretically possible to lower the pistons of all the hydraulic cylinders 32 by the average travel distance Xav, in a drawing operation with the pressure ring 30 in pressing contact with the upper die 18, and to apply the holding force Fso to the pressure ring 30 substantially equally through the cushion pins 24. However, the initial hydraulic pressure P0 is not necessarily accurate enough due to a possibility of existence of air in the hydraulic circuit including the cylinders 32, which causes a variation in the modulus K of elasticity of volume of the working fluid. In view of this drawback, the Ps adjusting block 140 is adapted to read the hydraulic pressure Ps in a test operation, and adjust the pressure Ps once adjusted to the initial value P0, so that the pressure Ps is made substantially equal to the target pressure P1 also calculated according to the P0, P1 block 138. If the actually detected hydraulic pressure Ps during the test operation is higher than the target value P1, some of the cushion pins 24 are not in abutting contact with the pressure ring 30, and the holding force Fso is applied to the pressure ring 30 through the other cushion pins 24 only. In this case, the initial hydraulic pressure P0 is lowered to move the cushion pins 24 upwards so that all the cushion pins 24 may contact the pressure ring 30. If the actual hydraulic pressure Ps is lower than the target value P1, on the other hand, the pistons of some of the hydraulic cylinders 32 are bottomed, and a portion of the holding force Fso acts on the pressure ring 30 directly through the cushion pad 28 and the cushion pins 24 corresponding to the bottomed pistons. In this case, the initial hydraulic pressure P0 is raised to avoid the bottoming of the pistons of any cylinders 32.

A Pbx calculating block 142 is for calculating the pneumatic pressure Pbx of the pneumatic cylinders 80 to produce a lifting force for counterbalancing the total weight of the main slide 20 and the upper die 18, according to the following equation (5), on the basis of the machine and die set information.

$$Pbx = (Wu + Ws)/Ab \qquad (5)$$

A Pb adjusting block 144 is for controlling the solenoid-operated pressure control valve 84 so that the pneumatic pressure Pb in the air tank 82 detected by the pneumatic pressure sensor 86 coincides with the pressure Pbx calculated according to the Pbx calculating block 142. With the pressure Pb thus adjusted, the pressing force Fpoi as specified by the die set information can be applied to the die set 12, 18, in a drawing operation, without an influence of the weights of the slide 20 and upper die 18. The pneumatic pressure Pbx may be calculated, with suitable compensation for a change in the volume of the pressure chamber of each pneumatic cylinder 80 due to a lowering movement of the main slide 20. In this respect, however, since the capacity of the air tank 82 is sufficiently large, the amount of change in the pneumatic pressure Pb due to the change in the volume of the pressure chamber of the cylinder 80 is so small and negligible.

An h adjusting block 146 is for adjusting the distances h associated with the four die-height adjusting mechanisms 52, independently of each other, on the basis of the machine information and the die set information, so as to provide the pressing force Fpoi for each plunger 22 as specified by the die set information. Initially, the reference value h0 which is the maximum value of the distance h when the pressing force Fpi of each plunger 22 is zero is determined from the corresponding load value Foi detected by the strain gages 61 on the corresponding plunger 22. Then, the distance h1 for obtaining the pressing force Fpoi is obtained from the provisional h-Fpi characteristic relationship (Fpi=a.h) as indicated by one-dot chain line in the graph of FIG. 8. Subsequently, the distance h is adjusted to the obtained value h1, with respect to the reference value h0, by operating the servomotor 60. In this condition, a test operation is conducted to measure the pressing force Fp1 on the basis of the load value detected by the strain gages 61. Since the predetermined provisional h-Fpi characteristic relationship is based on higher rigidity of the die set than the rigidity of the actually used die set 12, 14, the pressing force Fp1 is generally smaller than the pressing force Fpoi. Then, the distance h is changed to h2 which is smaller than h1 by a predetermined amount Δh, and the corresponding pressing force Fp2 is measured in the same manner as described above with respect to the value Fp1. Based on the thus obtained values Fp1, Fp2, and distances h1 and h2, a final h-Fpi characteristic relationship (Fpi=b.h) as indicated by solid line in FIG. 8 is obtained. The distance hx for obtaining the pressing force Fpoi is determined by the obtained final h-Fpi characteristic relationship. The servomotor 60 is operated to establish the determined distance hx. The determination of the distance hx and the adjustment of the distance h to the determined distance hx by the servomotor 60 are effected for each of the four mechanisms 52 (four plungers 22). The adjustment of the distance h according to the block assures the pressing force Fpoi as specified by the die set information, irrespective of a variation in the rigidity of the press 10 from one machine to another.

The controller 90 is also adapted to regulate the pneumatic pressure Pc in the air chamber 70 of the cylinder 66, so that the pressing force Foi detected by the strain gages 61 on each plunger 22 does not exceed a predetermined upper limit Foli (i=1, 2, 3, 4). That is, the solenoid-operated pressure control valve 74 is controlled to adjust the pneumatic pressure Pc to a predetermined optimum value Pcx. This optimum value Pcx is determined on the basis of the pressure-receiving area of the cylinder 62 and the pressure-receiving areas of the oil and air chambers 68, 70 of the cylinder 66, so that if a load exceeding the upper limit Foli acts on the overload-protective hydraulic cylinder 62, due to increased sliding resistance of the main slide 20, for example, the piston of the cylinder 66 may be moved towards the air chamber 70, thereby permitting the working oil to flow from the hydraulic cylinder 62 into the oil chamber 68 of the cylinder 66, and allowing the corresponding plunger 22 to be moved towards and relative to the main slide 20. This adjustment of the pneumatic pressure Pc is effected for all of the four cylinders 66 provided for the respective four plungers 22, so that the pressure values Pci of the four cylinders 66 are adjusted independently of each other. Since the optimum pneumatic pressure Pc is not influenced by the die set, the adjustment may be effected manually, i.e., by manipulation of the pressure control valve 74 by the operator of the press 10.

It will be understood from the above explanation that the press 10 designed to be equipped with the load measuring apparatus 100 is capable of automatically calculating optimum operating parameters such optimum pneumatic pressures Pax, Pbx, initial hydraulic pressure P0 and optimum distance hx, so as to establish the optimum operating (drawing) condition such as the optimum holding pressure Fso and optimum pressing force Fpoi as determined in a trial or test operation on a test machine, irrespective of variations or differences in the rigidity and sliding resistances of the press from one machine to another. The automatic calculation of the optimum operating parameters is effected by the controller 90, according to the machine information stored in the machine data memory 130 and the die set information stored in the die data memory 132 (received from the ID card 96 via the transmitter/receiver 94). The controller 90 is further adapted to automatically adjust the pneumatic pressures Pa, Pb, hydraulic pressure Ps and distance h to the calculated optimum values Pax, Pbx, P0 and hx. Thus, the press 10 which can be equipped with the apparatus 10 eliminates or minimizes the conventional cumbersome manual adjustment of the operating condition of the press by the trial-and-error procedure, and reduces the operator's work load upon setting up the press, while assuring high stability in the quality of formed products obtained.

It is not absolutely necessary to adjust the operating parameters Pa, Pb, Ps and h exactly to the optimum values Pax, Pbx, P0 and hx as calculated. In this respect, it is possible to provide certain ranges of tolerances for those operating parameters, within which the quality of the products produced by the press 10 satisfies appropriate requirements.

In the present embodiment, the weight Wa of the cushion pad 28 and the pressure-receiving area Aa of the pneumatic cylinder 42, which are stored in the memory 130 as part of the machine information, are obtained from the Fsi-Pa characteristic relationship, which in turn is obtained on the basis of the outputs of the strain gages 116 of the load measuring apparatus 100. Accordingly, the weight Wa as obtained reflects the influences of the sliding resistance between the pad 28 and the guide 40 and the sliding resistance of the piston 43 of the pneumatic cylinder 42. Further, the pressure-receiving area Aa as obtained reflects the influence of the air leakage of the pneumatic cylinder 42. With the actual pressure Pa adjusted to the optimum value Pax calculated according to the above equation (2), a drawing operation on the blank can be performed under the optimum holding force Fso, which prevents cracking or wrinkling of the product formed from the blank.

The load measuring apparatus 100 is also used when the number n and the positions of the cushion pins 24 to be used are determined. Namely, the distribution of the holding force on the pressure ring 30 (on the cushion pins 24) can be examined on the basis of the load values obtained by the strain gages 116 or 118 provided on the sensing elements 112 or pins 104 at different positions. A comparison of the load values obtained at the different positions facilitate the determination of the number n and positions of the cushion pins 24 which assure even distribution of the holding force Fso.

The load measuring apparatus 100 is further adapted so that the load values which act on the individual cushion pins 24 can be measured by the strain gages 118 provided on the sensing pins 104 corresponding to the respective cushion pins 24. Therefore, it is possible to measure optimum hydraulic pressure values Ps corresponding to different values of the holding force, which values Ps assure substantially even distribution of the holding force on all the cushion pins 24. Thus, an optimum Ps-Fs characteristic relationship can be obtained and stored as one item of the machine information in the machine data memory 130. The optimum hydraulic pressure Ps can be established based on the desired holding force Fso, according to the Ps-Fs relationship. The load values detected by the strain gages 118 can be used to detect a defect or failure of the cylinders 32, length variation of the cushion pins 24, a defect or failure of the pressure sensor 38, and perform other diagnostic functions. Similarly, the load values detected by the strain gages 116 can be utilized to diagnose the pneumatic cylinder 42 and pressure sensor 50, for example.

Figure 10:
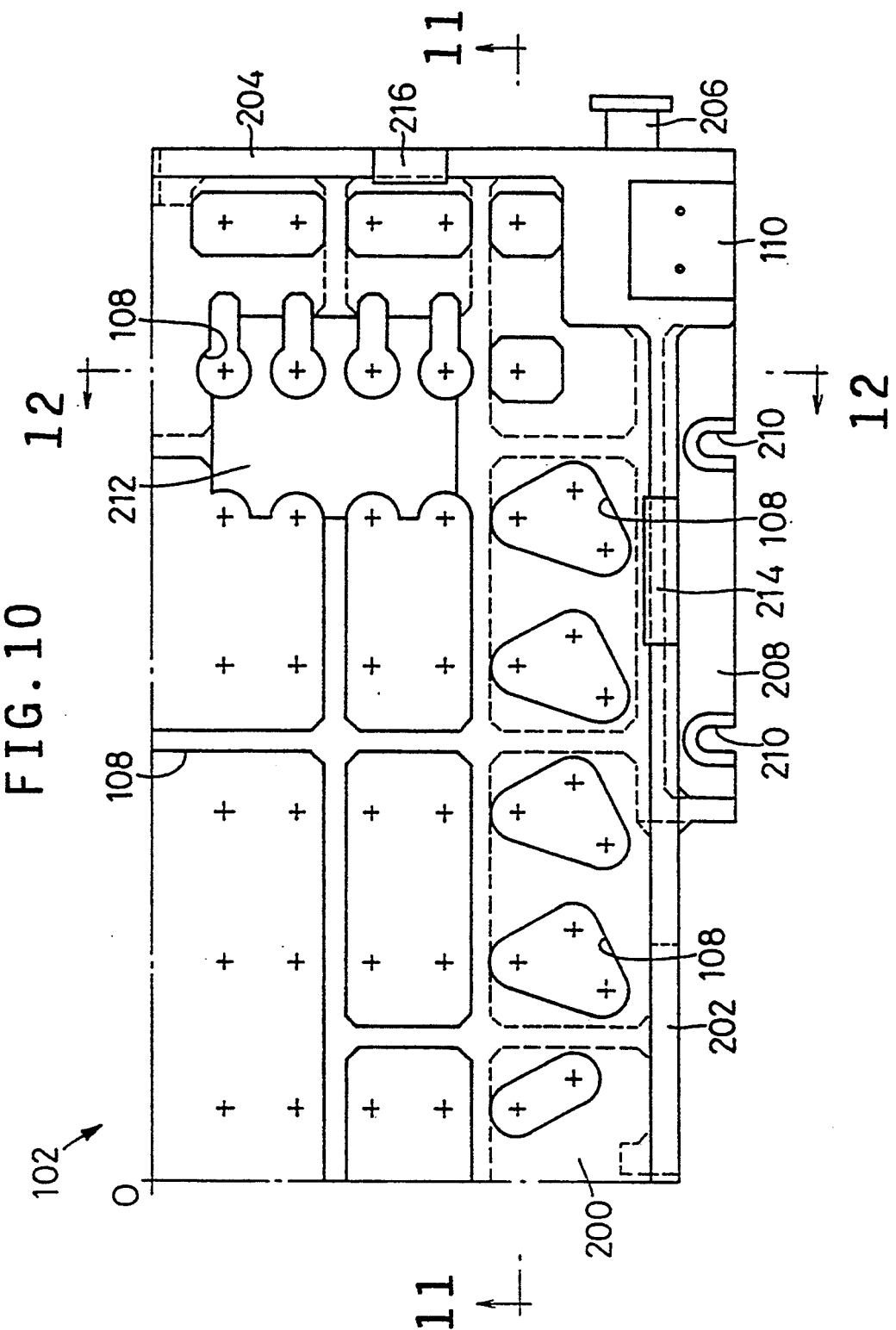
FIG. 10 is a plan view depicting a quarter of a positioning member 102 used in the measuring apparatus of FIG. 2.
Figure 11:
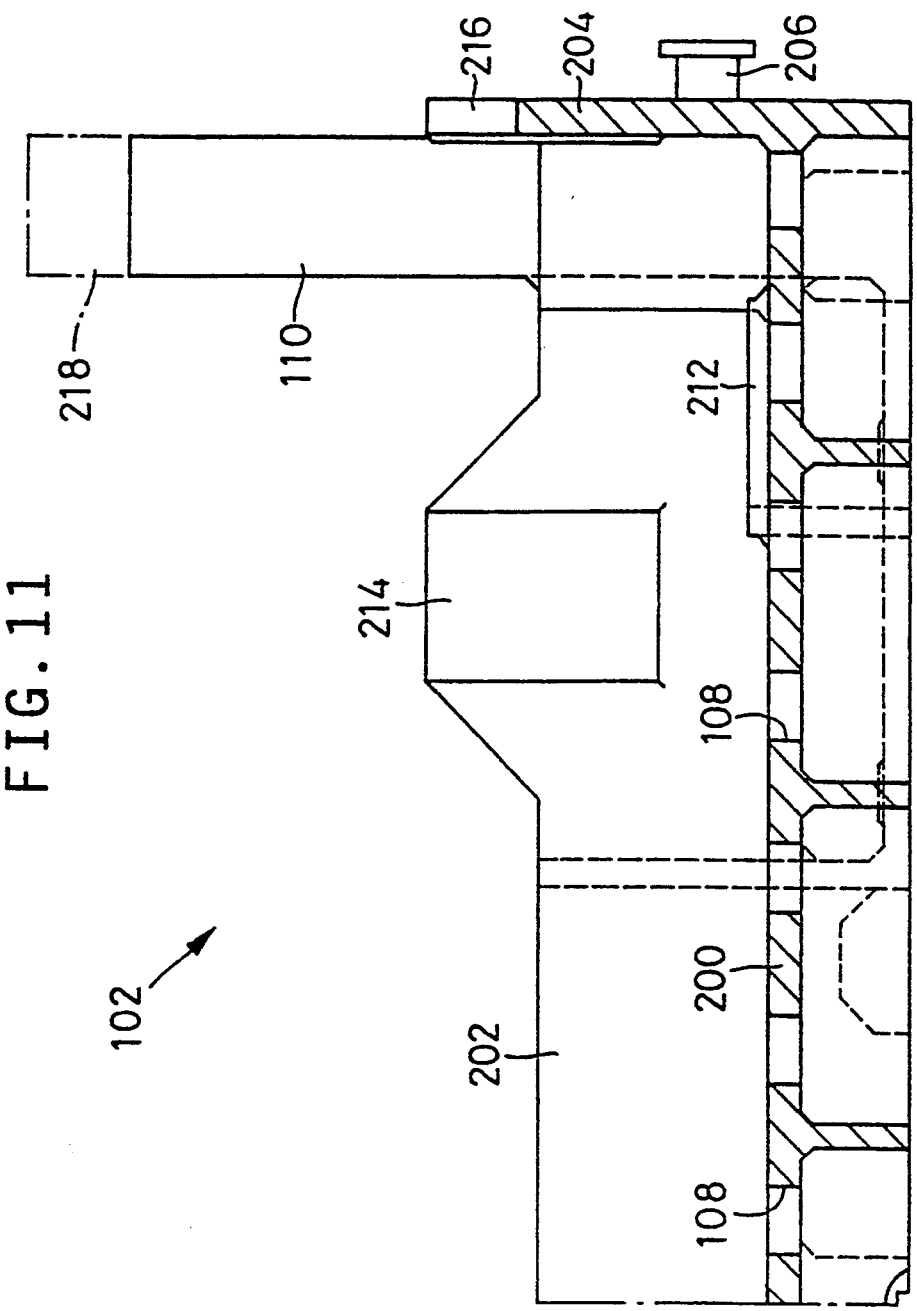
FIG. 11 is a cross sectional view taken along line 11—11 of FIG. 10.
Figure 12:
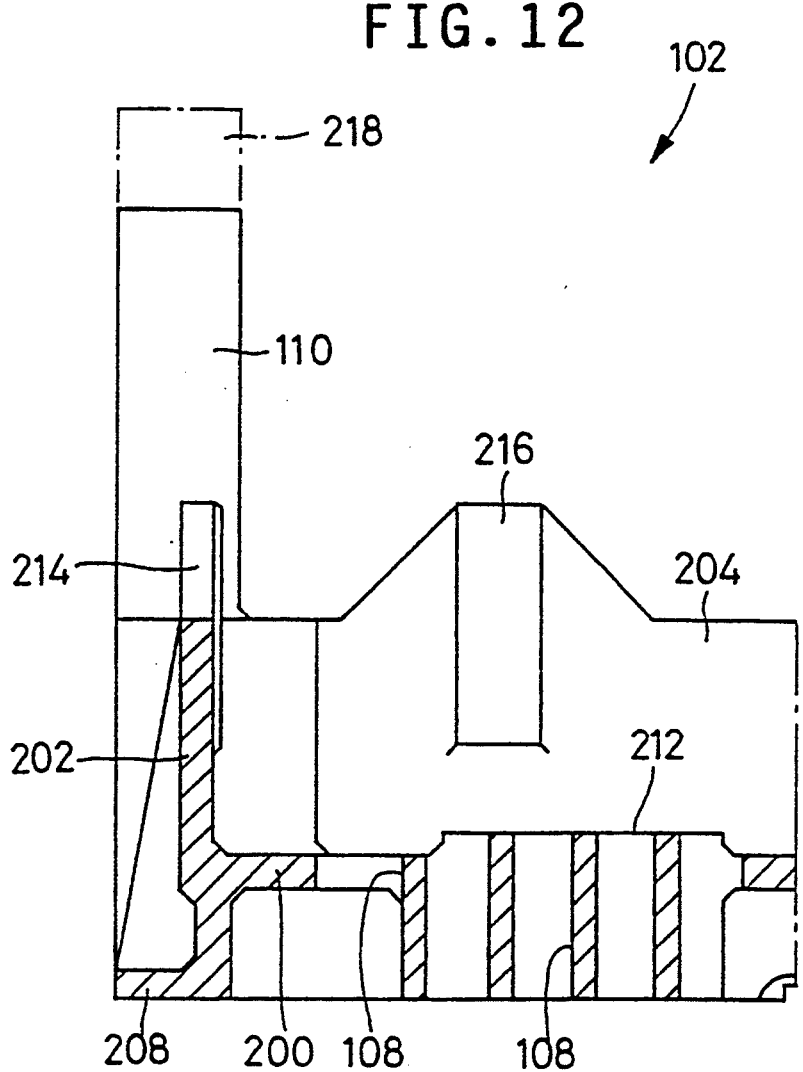
FIG. 12 is a cross sectional view taken along line 12—12 of FIG. 10.

Referring next to FIGS. 10–18, the load measuring apparatus 100 will be described in detail. FIG. 10 is a plan view of the positioning member 102, and FIGS. 11 and 12 are cross sectional views taken along lines 11—11 and 12—12 of FIG. 10, respectively.

The positioning member 102 has a rectangular bottom portion 200, two long side wall portions 202 formed along the opposite long sides of the rectangle of the bottom portion 200, and two short side wall portions 204 formed along the opposite short sides of the rectangle of the bottom portion 200. These bottom portion 200 and the side wall portions 202, 204 cooperate to form a rectangular box which is open upwards. FIG. 10 shows a right-lower quarter of the positioning member 102. In this figure, the center of the member 102 in a plane parallel to the bottom portion 200 is indicated at point 0, with respect to which the member 102 is symmetrical in the two mutually perpendicular directions that are parallel to the long and short side wall portions 202, 204, respectively. The long side wall portion 202 shown in FIG. 11 is opposite to that shown in FIG. 10, and the short side wall portion 204 shown in FIG. 12 is opposite to that shown in FIG. 10. The short side wall portions 204 have a total of four hooks 206 for wires or ropes for lifting and transporting the positioning member 102 together with the measuring member 104 accommodated therein, by using a crane or the like. The long side wall portions 204 have respective flanges 208 formed at their lower ends. Each flange 208 has cutouts 210 engageable with suitable clamping members provided on the bolster 14, so that the positioning member 102 is clamped on the bolster 14.

As described above, the apertures 108 are formed through the bottom portion 200, so that the cushion pins 24 extend through these apertures 108. These apertures 108 have different shapes depending upon their positions and the number of the cushion pins 24 which extend through each aperture 108. The shapes and positions of the apertures 108 are determined so as to minimize the weight of the positioning member 102 while assuring a sufficient mechanical strength thereof. In FIG. 10, the positions of the cushion pins 24 are indicated by "+" marks. The bottom portion 200 has four reinforced portions 212 which correspond to the four sensing elements 112 provided on the measuring member 106. These reinforced portions 212 are reinforced to provide higher mechanical strength than the other portions, since the reinforced portions 212 tend to receive a relative large load from the corresponding portions of the measuring member 106 when the plate 106 brought into abutting contact with the bottom portion 200. Each of the two side wall portions 202 has two sides 214, while each of the two side wall portions 204 has two guides 216. These guides 214, 216 extend upwards from the upper ends of the side wall portions 202, 204, and are relatively thick-walled with their inner surfaces located slightly inward of the inner surfaces of the side wall portions 202, 204. The guides 214, 216 function to guide the measuring member 106 in the vertical direction while positioning the plate 106 in the horizontal plane (preventing a movement of the plate 106 in the horizontal direction).

The four sensing posts 110 are formed at the respective four corner portions of the positioning member 102, as previously described. The sensing posts 110 are provided for measuring the holding force Fs associated with an outer slide 160 on a double-action press as generally shown at 150 in FIG. 19. When the load measuring apparatus 100 is used for the double-action press 150, a spacer block 218 is bolted to the top face of each of the four sensing posts 110, as shown in FIGS. 11 and 12 and FIGS. 13(a) and 13(b). The press 150 has a lower die 152 fixed on a bolster 154. The lower die 154 has an integrally formed pressure portion 153 which cooperates with a pressure ring 156 to hold a blank to be drawn. The pressure ring 156 is fixed to a holder plate 158 carried by an outer slide 160, which is vertically moved by outer plungers 166. The press 150 also has an inner slide 164 vertically moved by inner plungers 168. The inner slide 160 has an upper die in the form of a punch 162, which cooperates with the lower die 152 to perform a drawing operation on the blank while the blank is held by and between the pressure portion 153 and the pressure ring 156.

Figure 13A:
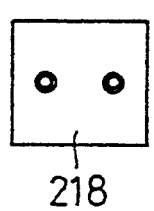
FIGS. 13(a) and 13(b) are views showing a spacer block attached to the positioning member of FIG. 10 when an outer load is measured on a double-action press.
Figure 13B:
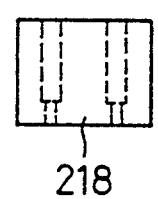

When the load measuring device 100 is used for the double-action press 150, the positioning member 102 and the measuring member 106 accommodated therein are installed on the bolster 154, in place of the lower die 152, pressure ring 156, punch 162, etc., so that the holding force Fs of the outer slide 160 which acts on the blank is measured by the strain gages 114 provided on the sensing posts 110, while a pressing force Fp of the inner slide 164 which also acts on the blank is measured by the strain gages 116 provided on the sensing pins 116 on the measuring member 106. The pressing force Fp does not include the holding force Fs, and is independent of the holding force Fs. When the apparatus 100 is used for the single-action press 10, the spacer blocks 218 are removed from the sensing posts 110, in order to avoid an interference with the main slide 20. FIG. 13(a) is a plan view of the spacer block 218, while FIG. 13(b) is a front elevational view of the spacer block 218.

Figure 14:
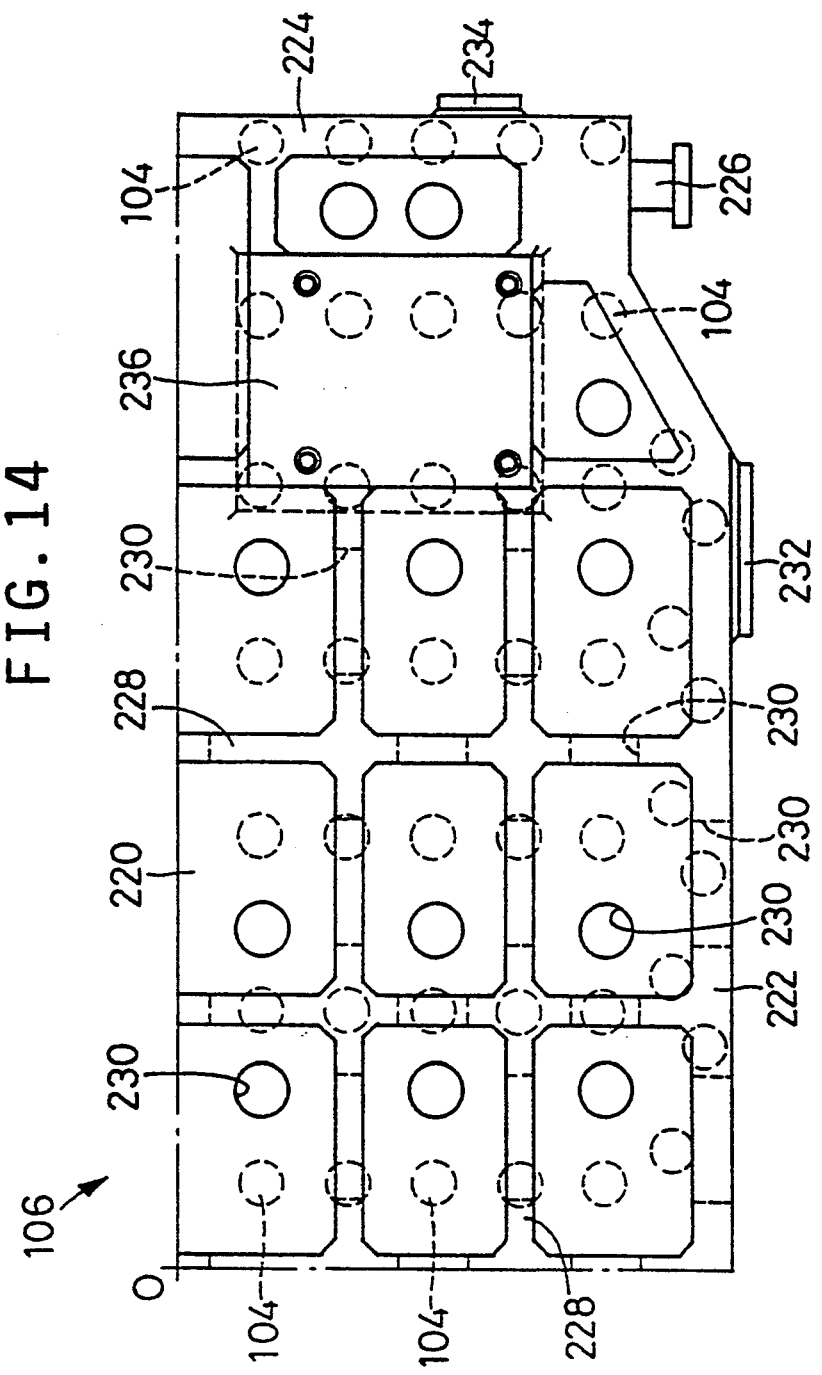
FIG. 14 is a plan view depicting a quarter of a measuring member 106 used in the measuring apparatus of FIG. 2.
Figure 15:
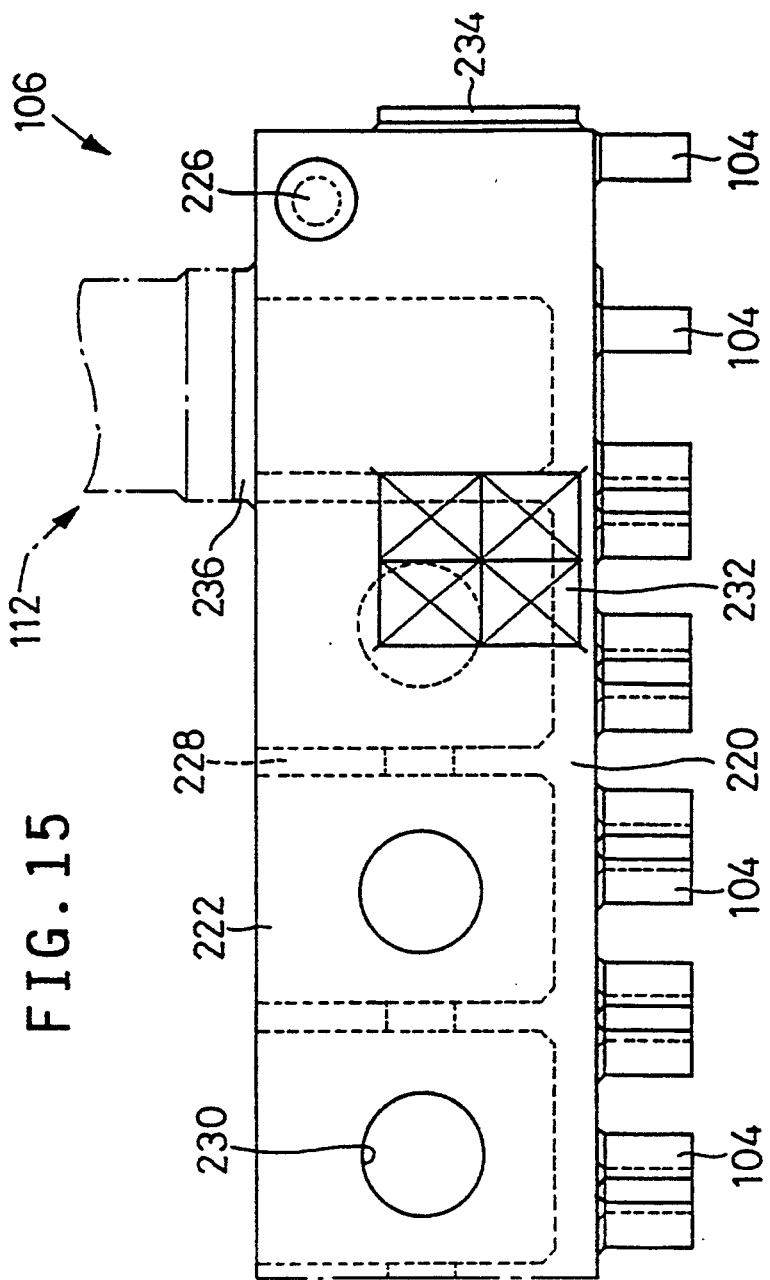
FIG. 15 is a front elevational view of the measuring member of FIG. 14.

Referring to the plan and front elevational views of FIGS. 14 and 15, the measuring member 106 has a bottom portion 220 having a rectangular shape smaller in size than the bottom portion 200 of the positioning member 102. The measuring member 106 also have two long side wall portions 222 formed along the opposite long sides of the rectangle of the bottom portion 220, and two short side wall portions 224 formed along the opposite short sides of the rectangle. The bottom and side wall portions 220, 222, 224 cooperate to form a rectangular box which is open upwards. FIG. 14 shows a right-lower quarter of the measuring member 106, wherein, the center of the member 106 in a plane parallel to the bottom portion 220 is indicated at point 0, with respect to which the member 106 is symmetrical in the two mutually perpendicular directions that are parallel to the long and short side wall portions 222, 224, respectively. FIG. 15 shows a right half of the member 106 as seen in the longitudinal direction of the long side wall portions 222. The long side wall portions 22 have a total of four hooks 226 for wires or ropes for lifting the measuring member 106, by a crane or the like, when the member 106 is positioned within the positioning member 102. The side wall portions 222, 224 have a height suitably determined depending upon the operating stroke of the press 10, and are formed with a multiplicity of inner ribs 228 for their structural reinforcement. These ribs 228, and the bottom and long side wall portions 220, 222 have holes 230 for reducing the weight of the member 106.

Figure 16A:
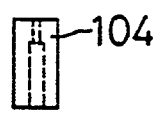
FIGS. 16(a) and 16(b) are views showing one of pins 104 which project from the underside of the measuring member of FIG. 14.
Figure 16B:
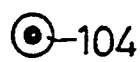
Figure 17A:
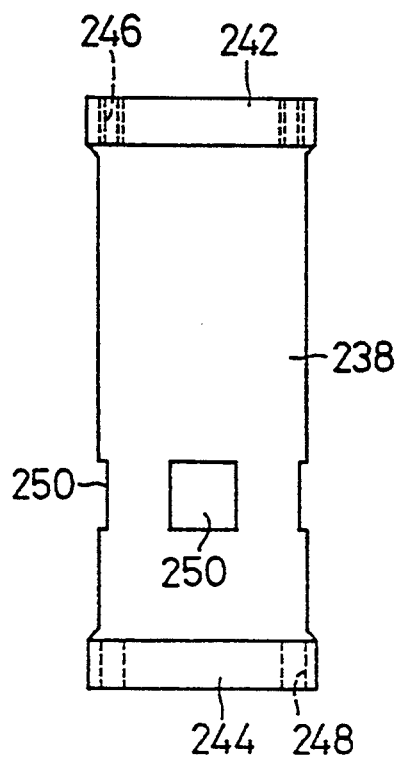
FIGS. 17(a) and 17(b) are views showing a first block of a sensing element disposed on the measuring member of FIG. 14.
Figure 17B:
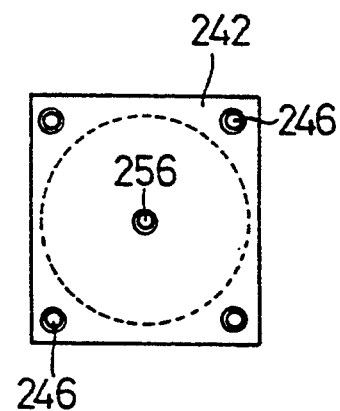

The sensing pins 104 are attached to the underside of the bottom portion 220, at the positions corresponding to the cushion pins 24. The measuring member 106 is supported by the cushion pins 24 such that the sensing pins 104 rest on the upper end faces of the corresponding cushion pins 24. As shown in FIGS. 16(a) and 16(b), each sensing pin 104 is formed separately from the measuring member 106, and is bolted to the measuring member 106. For bolting the pins 104, the bottom portion 220 have respective tapped holes. Selected ones of the sensing pins 104 have respective sets of strain gages 118, while the other pins 104 do not have any strain gages. The pins 104 provided with the strain gages 118 are selected so as to detect the distribution of the holding force acting on the pressure ring 30. Each of the side wall portions 222, 224 has two engaging portions 232, 234 protruding a short distance from the outer surface thereof. When the measuring member 106 is accommodated within the positioning member 102, the engaging portions 232, 234 slidably engage the respective guides 214, 216 provided on the side wall portions 202, 204 of the positioning member 102, so that the measuring member 106 is positioned in the horizontal plane with the sensing pins 104 located right on the respective cushion pins 24. This arrangement permits automatic positioning of the measuring member 106 relative to the cushion pins 104 when the positioning member 102 is positioned on the bolster 14. Further, the guides 214, 216 and the engaging portions 232, 234 prevent displacement of the measuring member 106 relative to the positioning member 102 upon abutting contact of the main slide 20 against the measuring member 106. FIG. 16(a) and FIGS. 16(b) are front elevational and plan views of the pin 104, respectively.

The bottom portion 220 of the measuring member 106 have four reinforced mounts 236 to which the sensing elements 112 are secured. Each sensing element 112 consists of a first block 238 shown in FIGS. 17(a) and 17(b), or a combination of the first block 238 and a second block 240 shown in FIGS. 18(a) and 18(b). The first block 238 is a cylindrical member having an upper and a lower rectangular flange 242, 244 formed at upper and lower ends thereof. The upper flange 242 has four tapped holes 246, while the lower flange 244 has four through-holes 248. The first block 238 is fixed to the appropriate mount 236 such that bolts extending through the through-holes 248 are screwed into respective tapped holes formed in the mount 236. The circumferential surface of the cylindrical portion of the first block 238 has four flat portions 250 equally spaced from each other in the circumferential direction. The four strain gages 116 are attached to the respective flat portions 250.

Figure 18A:
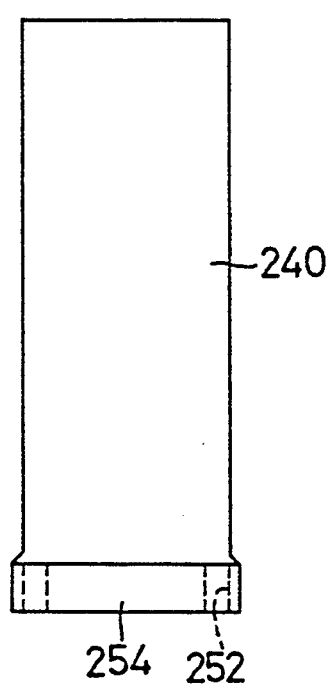
FIGS. 18(a) 18(b) are views showing a second block of the sensing element.
Figure 18B:
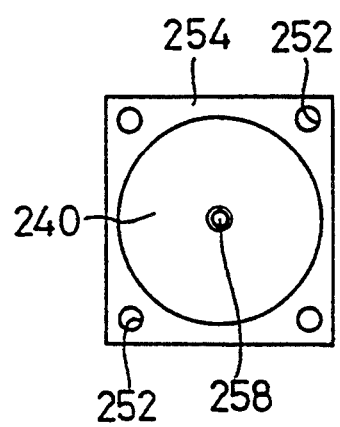

When the operating stroke of the press 10, 150 on which the measuring member 106 is used is relatively small, only the first block 238 is used as the sensing element 112. When the operating stroke is relatively large, the second block 240 is connected to the first block 238. The second block 240 is also a cylindrical member, which has a rectangular flange 254 at its lower end. The flange 254 has four through-holes 252. To fix the second block 240 to the first block 238, bolts are inserted through the through-holes 252 and screwed in the respective tapped holes 246 formed in the upper flange 242 of the first block 238. The sensing element 112 shown in FIGS. 2 and 20 consists of the first and second blocks 238, 240 fixed to each other. The first and second blocks 238, 240 have a tapped hole 256, 258 for a hook for lifting and transportation by a crane or the like. FIGS. 18(a) and 19(a) are front elevational views of the blocks 238, 240, while FIGS. 18(b) and 19(b) are plan views of the blocks. For various types of press having different operating strokes, first and second blocks having different height dimensions are desirably prepared for the sensing elements 112.

Referring next to FIGS. 21-26, there will be described a second embodiment of the present invention. In FIG. 21, the same reference numerals as used in FIG. 2 are used to identify the structurally identical components.

The second embodiment uses a load measuring apparatus 260, which has a measuring member 262 to be supported by the cushion pins 24, and holder plate 265 fixed to the main slide 20. The holder plate 265 carries four sensing elements 264 fixed to its underside. The sensing elements 264 are positioned within a blank holding area corresponding to the pressure ring 30 (FIG. 1). Each sensing element 264 has strain gages 266, which are connected to the electromagnetic oscilloscope 122 via the dynamic strain detector 120, as shown in FIG. 2, so that the load values detected by the strain gages 266 on the sensing elements 264 are recorded on a suitable photosensitive recording medium by the oscilloscope 122.

As shown in the plan view of FIG. 22(a) and the front and side elevational views of FIGS. 22(b) and 22(c), the measuring member 262 is a generally rectangular planar men, her having criss-crossed grooves 270 formed in the lower surface 268. The member 262 also has four relatively short grooves 274 formed in the upper surface 272. These grooves 274 are aligned with the opposite end portions of the criss-crossed grooves 270. Two through-holes 276, 278 are formed at each of the longitudinal end portions on opposite sides of the measuring member 262, such that the two through-holes 276, 278 are located on opposite sides of the appropriate groove 274. The two through-holes 276, 278 have different diameters and are selectively used depending upon the diameter of two guide pins 280 used. As shown in FIG. 21, the guide pins 280 have a larger length than the cushion pins 24, and are installed so as to extend the through-holes 26 of the bolster 14 and the selected through-holes 276 or 278 of the measuring member 262. Thus, the measuring member 262 is positioned by the guide pins 280 in the horizontal plane. The guide pins 280 have the same diameter as the cushion pins 24, and are structurally identical with the cushion pins 24, except for the length. Since the measuring member 262 have the through-holes 276, 278 having the different diameters, it can be used for two different types of press which use the cushion pins 24 of respective different diameters. The diameter of the guide pins 280 is selected depending upon the diameter of the cushion pins 24 used. The measuring member 262 has four recesses at the respective corners, at which hooks 284 are bolted to facilitate lifting and transportation of the member 262 by a crane.

As shown in the plan and front view of FIG. 23(a) and the side elevational views of FIGS. 23(b) and 23(c), the holder plate 265 is a generally rectangular planar member, which has criss-crossed grooves 288 formed in the lower surface 286 remote from the main slide 20. The holder plate 265 also have a plurality of tapped holes 290 in the lower surface 286 for fixing the sensing elements 264. Each sensing element 264 is secured to the holder plate 265 by four bolts. Although the four sensing elements 264 are usually mounted on the holder plate 265 as shown in FIG. 24, the holder plate 265 has a total of 24 tapped holes 290, so that up to six sensing elements 264 can be mounted on the holder plate 265. The holder plate 265 have a plurality of engaging portions 292 formed in the opposite long side faces, so that the holder plate 265 is fixed to the main slide 20 such that suitable clamping members provided on the main slide 20 engage the engaging portions 292. Like the measuring plate 262, the holder plate 265 has four recesses 292 at the respective corners, at which hooks 296 are bolted to facilitate lifting and transportation of the holder plate 265 by a crane. For safe transportation of the measuring member 262 and the holder plate 265 with the sensing elements 264, the holder plate 265 with the sensing elements 264 attached thereto is first placed on the measuring member 262, and wires are fastened to the hooks 284 and 296 so as to bind the measuring member 262 and holder plate 265 together as an assembly, which is then lifted by a crane or the like.

Although each sensing element 264 may be generally cylindrical like the sensing element 112 used for the load measuring apparatus 100 of the first embodiment, the sensing element 264 is preferably constructed to have a relatively small weight, because of its installation on the main slide 20. In the present second embodiment, therefore, each sensing element 264 uses a first assembly 298 having a relatively large height dimension, and/or a second assembly 300 having a relatively small height dimension, as illustrated in FIG. 24. For reduced weight, each of the assemblies 290, 300 uses four square prisms. In the interest of brevity, the perspective view of FIG. 24 does not show the grooves 288, engaging portions 292, etc. provided on the holder plate 265.

Figure 25A:
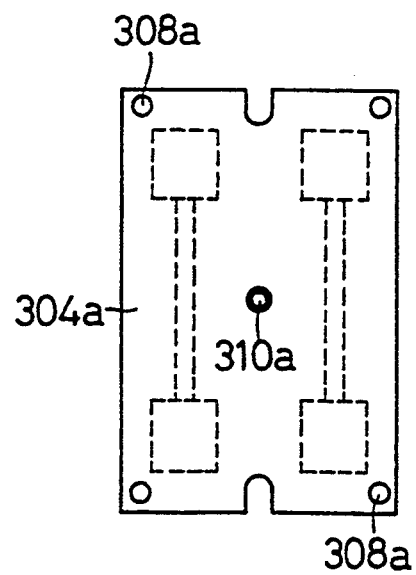
FIGS. 25(a), 25(b) and 25(c) are a plan view, and a front and a side elevational view, respectively, showing a first assembly 298 of the sensing element of FIG. 24.
Figure 25B:
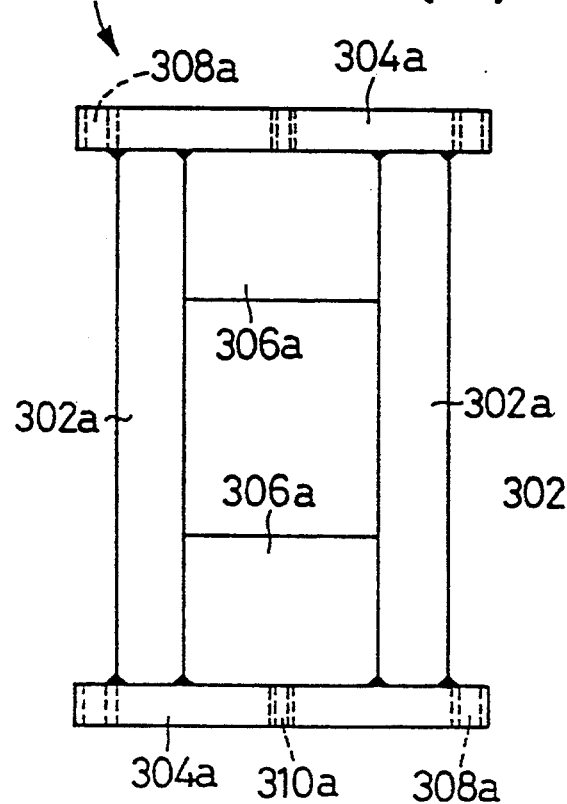
Figure 25C:
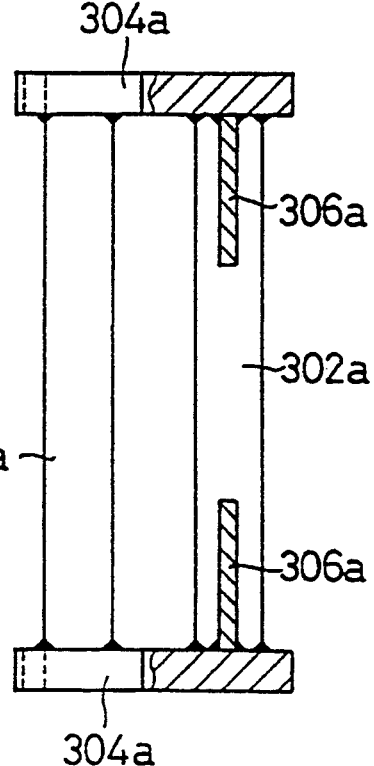

As shown in the plan view of FIG. 25(a) and the front and side elevational views of FIGS. 25(b) and 25(c), the first assembly 298 four square prisms 302a, a pair of plates 304a secured to the upper and lower ends of the prisms 302a, and four rib plates 306a connecting the adjacent prisms 302a. These elements 302a, 304a, 306a are welded together into the first assembly 298. Each of the plates 304a has through-holes 308a formed at the respective four corners, and a tapped hole 310a formed in a central portion thereof. The first assembly 298 is attached to the holder plate 265 and connected to the second assembly 300, with bolts inserted through the through-holes 308a. The through-holes 310a are provided for fixing a hook for lifting or transporting the first assembly 298 by a crane or the like. As shown in the plan view of FIG. 26(a) and the front and side elevational views of FIGS. 26(b) and 26(c), the second assembly 300 consists of square prisms 302b, a pair of plates 304b and four rib plates 306b, which are similar in construction to those used in the first assembly 298, except that the height dimensions of the prisms 302b and rib plates 302b are smaller than those of the prisms 302a and rib plates 306a, respectively.

Depending upon the operating stroke of the press on which the load measuring apparatus 260 is installed, the sensing elements 264 attached to the holder plate 265 consists of only the first or second assembly 298, 300, or both of the two assemblies 298, 300 as shown in FIG. 24. Two or more sets of the first and/or second assemblies 298,300 having different height dimensions may be prepared and used. The strain gages 266 may be provided on either the first assembly 298 or the second assembly 300, in a manner as desired. All of the four square prisms 302a, 302b may be provided with the respective gages 266, or alternatively a selected one of the four prisms may be provided with the gage 266.

The thus constructed load measuring apparatus 260 installed on the press is operated with the main slide 20 lowered towards the bolster 14, such that the sensing elements 264 on the holder plate 265 are brought into abutting contact with the measuring member 262, causing the cushion pins 24 and the cushion pad 28 to be pushed down against the biasing action of the pneumatic cylinders 42. In this way, the effective holding force expected to be applied to the pressure ring can be accurately measured by the strain gages 266, with the sliding resistances of the press taken into consideration. Further, by finding out the holding force in relation to the varying pneumatic pressure Pa of the pneumatic cylinders 42, the effective total pressure-receiving area As of the pneumatic cylinders 42 and the weight Wa of the cushion pad 28 can be obtained, with the possible air leakage of the cylinders 42 and the sliding resistance associated with the cushion pad 28 taken into account. In addition, the distribution of the holding force can be detected on the basis of the load values detected by the strain gages 266 provided on the individual sensing elements 264.

In the present second embodiment wherein no sensing elements are provided for detecting the load values acting on the individual cushion pins 24, it is possible to provide selected ones of the cushion pins 24 with respective sensing pins having the same diameter as the pins 24, so that the load values acting on the selected cushion pins 24 are detected by strain gages attached to the sensing pins, as in the first embodiment.

A third embodiment of the load measuring apparatus of this invention is shown generally at 312 in FIG. 27. Unlike the apparatus 260 according to the second embodiment of FIG. 21, the apparatus 312 uses a positioning member 314 resting on the bolster 14, so as to position the measuring member 262. The positioning member 314 has a multiplicity of through-holes 316 for the cushion pins 24, and a plurality of guides 318 similar to the guides 214, 216 used in the first embodiment. The guides are formed on the inner surfaces of the side wall portions, so that the guides 318 slidably contact the end faces of the measuring member 262, to thereby guide the measuring member 262.

Figure 28:
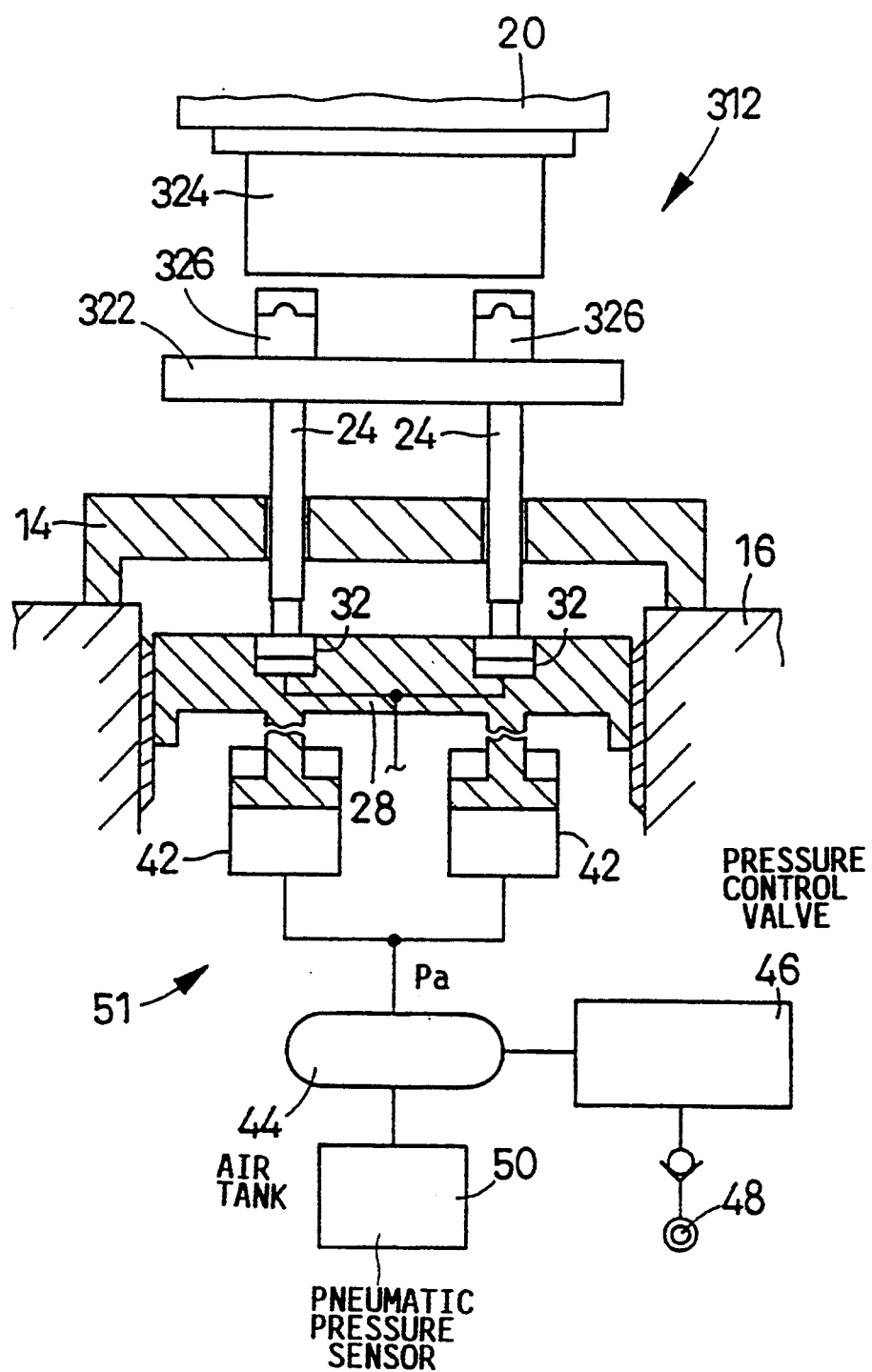
FIG. 28 is a schematic elevational view partly in cross section showing a press as equipped with a fourth embodiment of the present invention.
Figure 29:
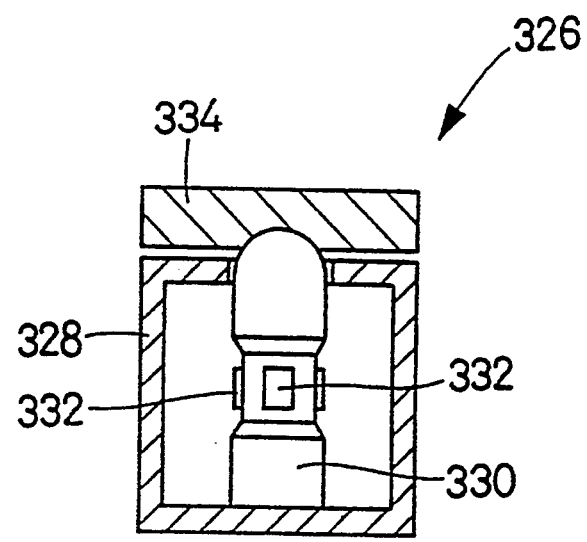
FIG. 29 is a cross sectional view of a load cell used in the measuring apparatus of the embodiment of FIG. 28.

Referring next to FIGS. 28 and 29, there is shown a load measuring apparatus 320 constructed according to a fourth embodiment of the present invention. The apparatus uses a measuring member 322 resting on the cushion pins 24, an upper die plate 324 secured to the main slide 20, and load cells 326 disposed on the measuring member 322 to measure the holding force. The upper die plate 324 is attached to the main slide 20 in place of the upper die 18. The die plate 324 has high rigidity that the upper die 18, and the height dimension of the die plate 324 is determined depending upon the operating stroke of the press, so that the cushion pad 28 is lowered via the load cell 326, measuring member 322 and cushion pins 24, upon abutting contact of the die plate 324 against the load cells 326 when the main slide 20 is lowered. As shown in FIG. 29, each load cell 326 consists of a casing, a rod 330 disposed substantially within the casing, four strain gages 332 attached to the respective surfaces of the rod 330, and a load receiver 334 engaging a part-spherical head of the rod 330 which projects upwards from the upper wall of the casing. The four strain gages 332 are connected so as to form a bridge circuit. The load receiver 334 is universally pivotable about the semi-spherical head of the rod 330. The load values detected by the strain gages 332 are recorded by a suitable recording device such as the electromagnetic oscilloscope 122 described above. It will be understood that the rods 330 of the load cells 326 serve as sensing elements, while the strain gages 332 function to detect the holding force expected to be applied to the pressure member (pressure ring) of the press. The number and position of the load cells 326 are suitably determined depending upon the area in which the holding force actually acts on the pressure member of the press. For example, the four load cells 326 are disposed on the measuring member 322. The load cells 326 may be simply placed on the measuring member 322, or may be bolted or otherwise secured to the measuring member 322. Suitable height adjusting shims may be used on selected ones of the load cells 326, to avoid the application of excessive loads to some of the load cells 326 due to inclination of the cushion pad 28, or for other reasons.

Figure 30:
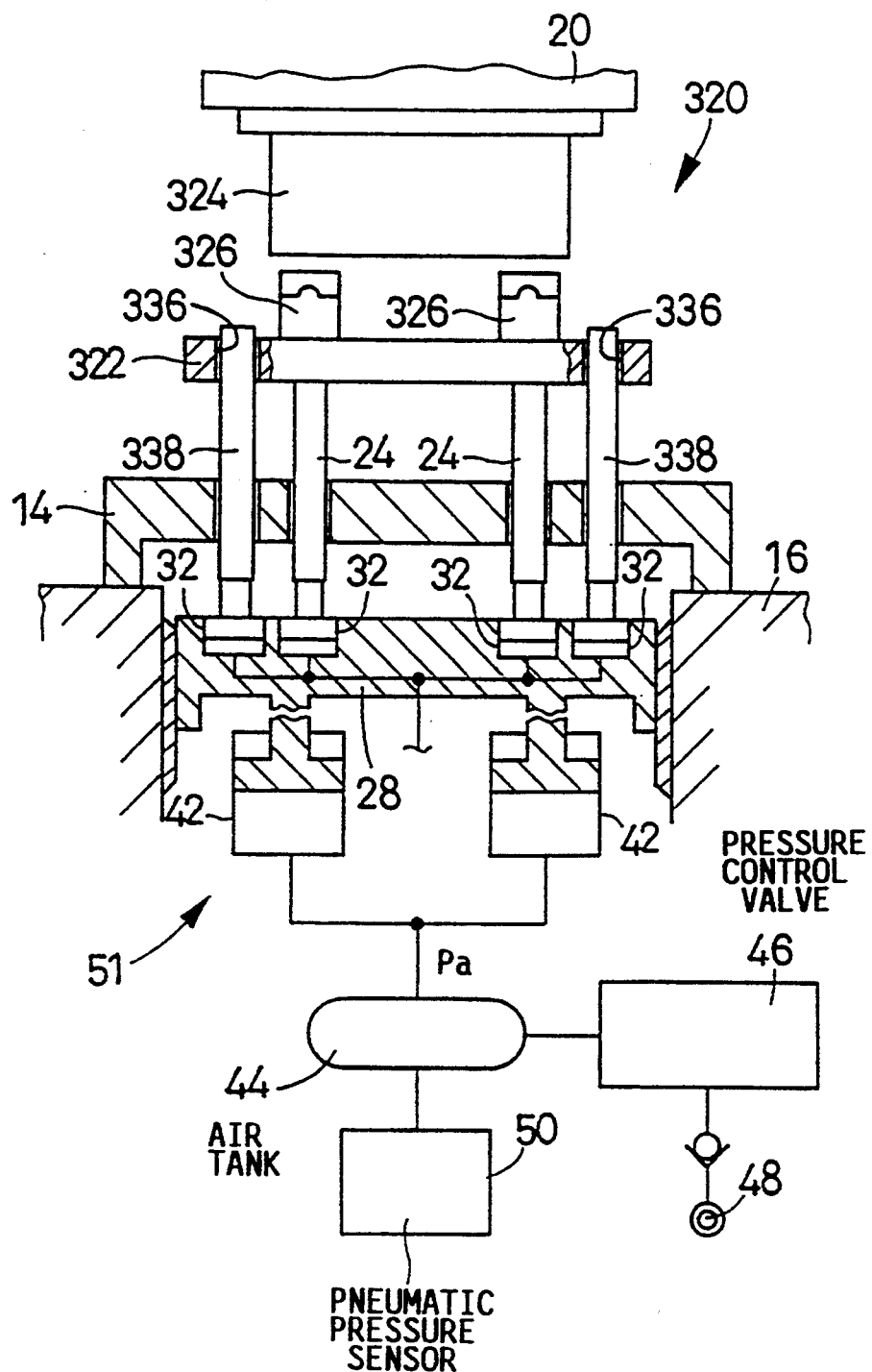
FIG. 30 is an elevational cross sectional view showing a press as equipped with a fifth embodiment of the invention which includes guide pins for guiding the measuring member.

The load measuring apparatus 320 of FIG. 28 is similar in operation to the apparatus 260 of FIG. 21. However, the apparatus 320 may be modified as shown in FIG. 30. In this modified fifth embodiment, the measuring member 322 has a plurality of through-holes 336 for guide pins 338 which have a larger length as the cushion pins 24. Like the guide pins 280 shown in FIG. 21, the guide pins 338 are used in place of the appropriate cushion pins 24, so as to position and guide the measuring member 322 so as to prevent horizontal displacement thereof due to impact during operation of the apparatus 320. Alternatively, the apparatus 320 of FIG. 28 may be provided with a positioning member as used in the apparatus 312 of FIG. 27, so that the positioning member on the bolster 14 serves to position and guide the measuring member 322.

Figure 19:
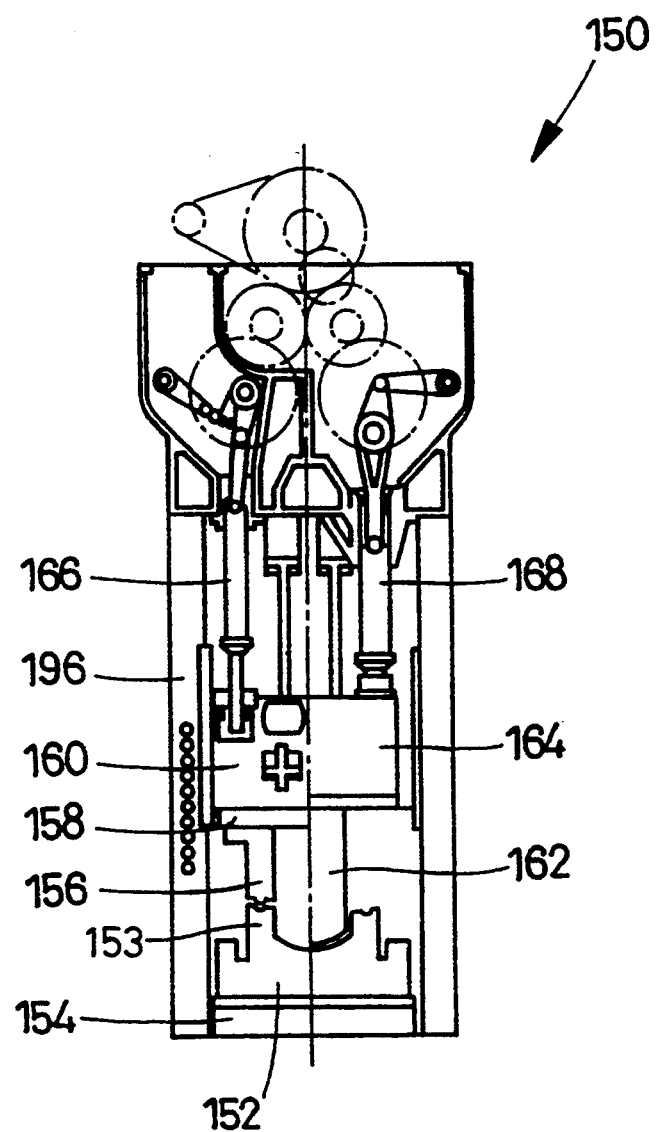
FIG. 19 is an elevational view showing an example of a double-action press.
Figure 20:
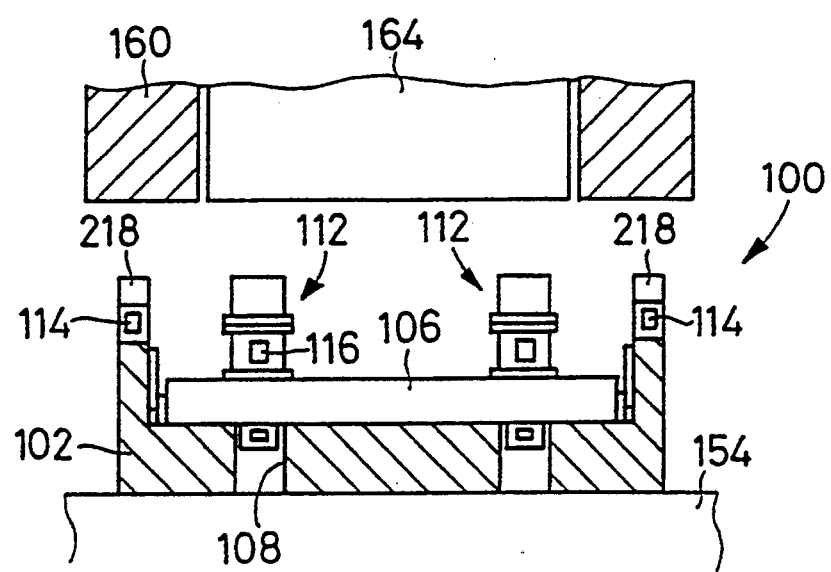
FIG. 20 is an elevational view in cross section showing the measuring apparatus of FIG. 2 as incorporated in the double-action press FIG. 19.
Figure 31:
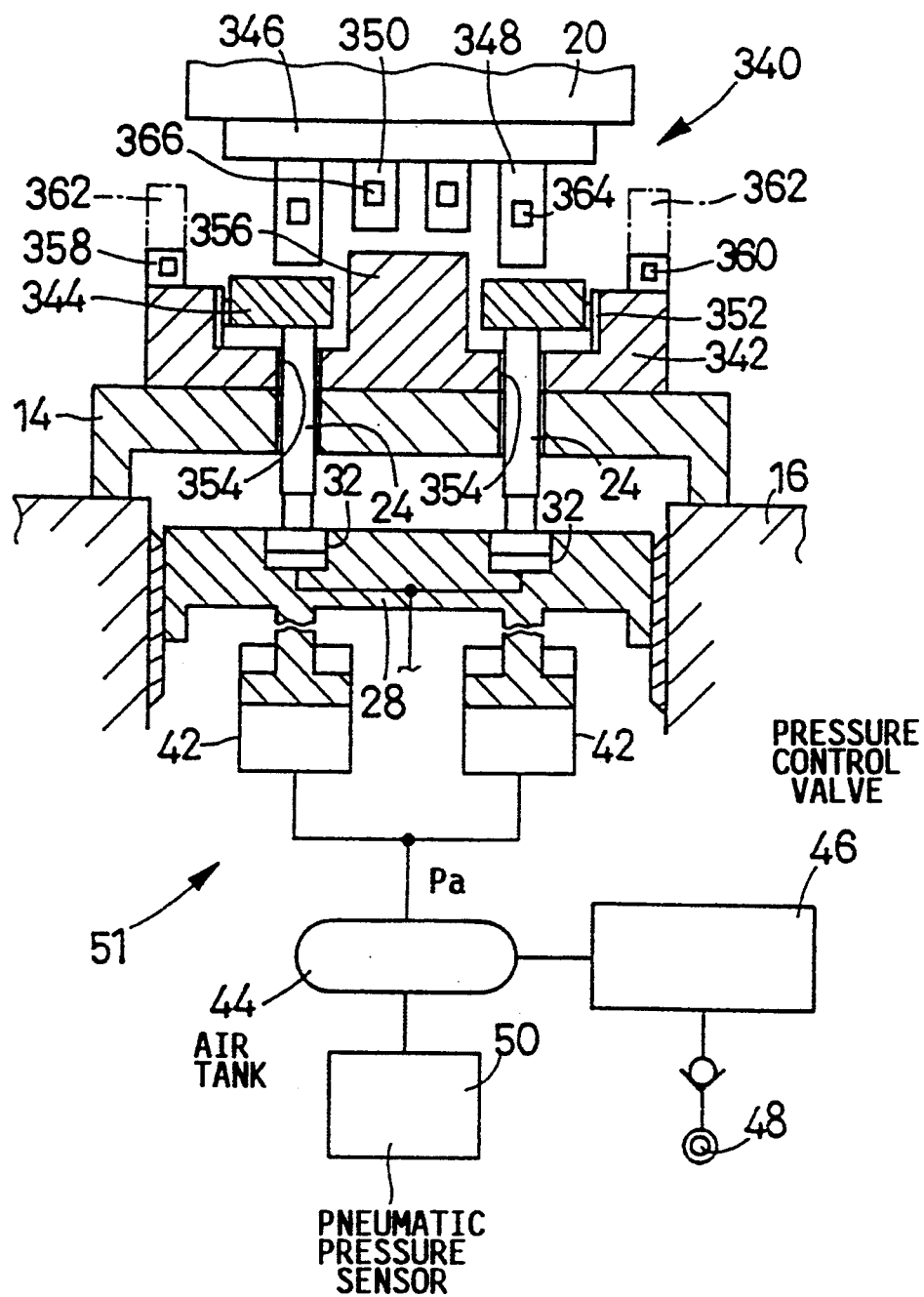
FIG. 31 is a schematic view showing a sixth embodiment of the invention.

A load measuring apparatus 340 constructed according to a sixth embodiment of this invention is illustrated in FIG. 31. Like the apparatus 100 of the first embodiment of FIG. 2, the apparatus 340 is adapted to measure the pressing force as well as the holding force, and the holding force associated with the outer slide of the double-action press. The apparatus 340 includes: a positioning member 342 disposed on the bolster 14; a measuring member 344 in the form of a ring accommodated within the positioning member 342 and supported by the cushion pins 24; and two kinds of sensing elements 348, 350 of different height dimensions which are attached to a holder plate 346 carried by the main slide 20. The positioning member 342 has a plurality of guides 352 which slidably contact the outer circumferential surface of the annular measuring member 344, to thereby position and guide the measuring member 344. The positioning member 342 also has a plurality of through-holes 354, so that the cushion pins 24 right below the annular measuring member 344 extend through the through-holes 354 to support the member 344. The positioning member 342 is formed with a central abutting block 356 for measuring the pressing force expected to act on the blank during a pressing operation on the press. The positioning member 342 further has four upwardly projecting sensing posts 354 formed at the respective four corners. Strain gages 360 are provided on the sensing posts 358. For measuring the holding force on the double-action press as shown in FIG. 19, suitable spacer blocks 362 are attached to the upper ends of the respective sensing posts 358, so that the load values acting on the sensing posts 358 are detected by the strain gages 360. When the present apparatus 340 is used for the single-action press, the spacer blocks 362 indicated by one-dot chain line in FIG. 31 are removed to avoid an interference with the main slide 20.

The sensing elements 348 are provided for measuring the holding force expected to be applied to the pressure member such as the pressure ring 30 used on the press 10 as shown in FIG. 1. For example, four sensing elements 348 are disposed in facing relation with the annular measuring member 344. Each of the sensing elements 348 is provided with strain gages 364. In operation of the apparatus 340, the main slide 20 is lowered to bring the sensing elements 348 into abutting contact with the measuring member 344, whereby the measuring member 344 is pushed down against the biasing force of the pneumatic cylinders 42. The load values acting on the sensing elements 348 at this time are detected by the strain gages 364. The height dimension of the sensing elements 348 is determined depending upon the operating stroke of the press, so that the measuring member 344 is lowered by the abutting contact of the sensing elements 348 with the measuring member 344. The strain gages 364 serve as means for detecting the holding force.

The sensing elements 350 are provided for measuring the pressing force expected to act on the blank during an operation of the press. For example, four sensing elements 350 are disposed in facing relation with the abutting block 356. Each of the sensing elements 350 is provided with strain gages 366. In operation of the apparatus 340, the sensing elements 350 are brought into abutting contact with the abutting block 356, to measure the pressing force by the strain gages 366. The pressing force as detected by the strain gages 366 does not include the holding force. The height dimensions of the sensing elements 350 and abutting block 356 are determined depending upon the operating stroke of the press, so that the sensing elements 350 come into abutting contact with the abutting block 356 after the measuring member 344 is lowered by a suitable distance due to its contact with the sensing elements 348.

It is noted that the strain gages 360, 364 and 366 are all connected to suitable recording means such as the electromagnetic oscilloscope 122 through the dynamic strain detector 120, so that the load values detected by the strain gages are recorded on a recording medium such as a photosensitive paper.

Although the sensing elements 348, 350 are both provided on the holder plate 346 on the main slide 20, the apparatus 340 may be modified such that the sensing elements 348 are provided on the measuring member 344 while the sensing elements 350 are provided on the abutting block 356.

Figure 32:
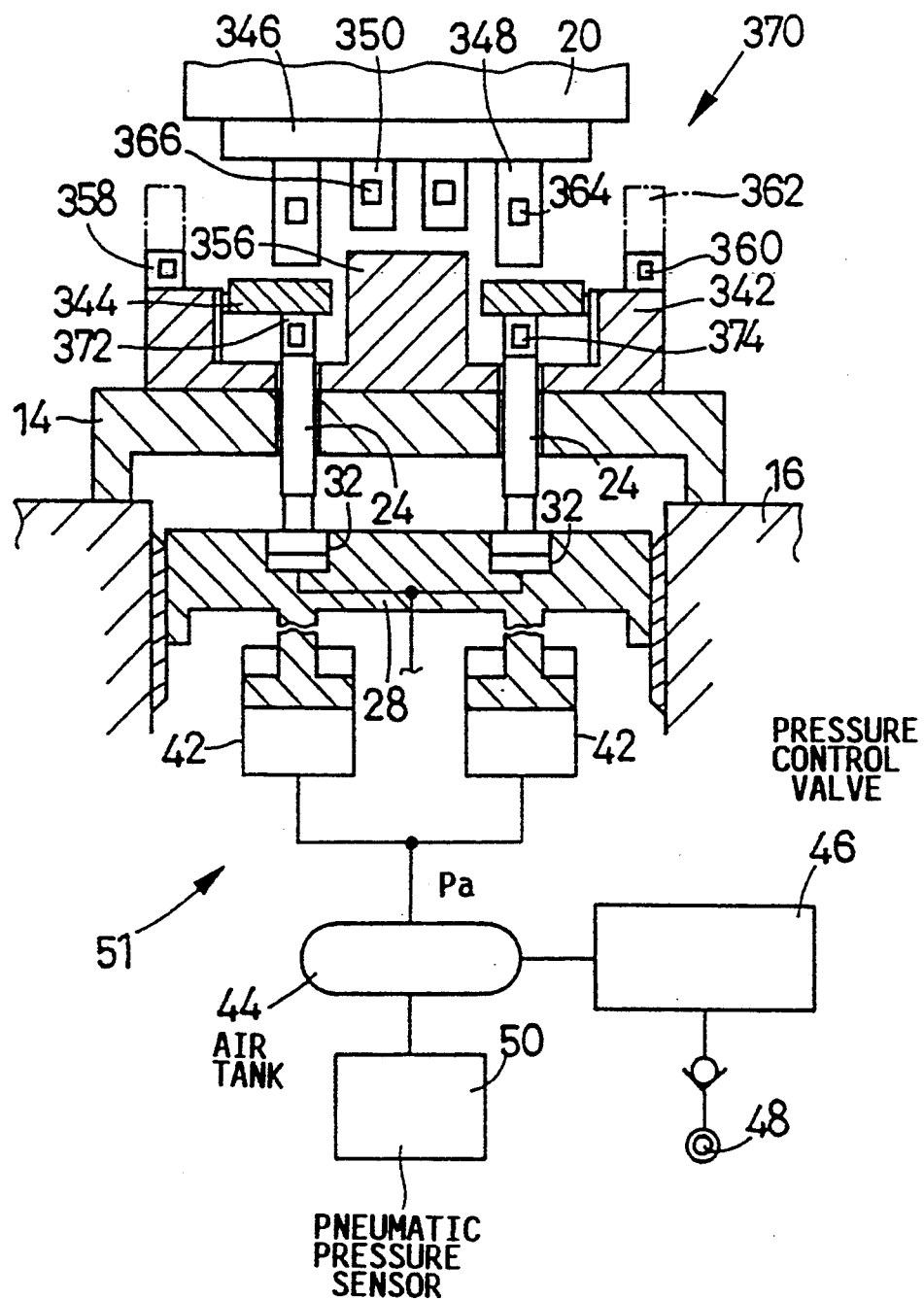
FIG. 32 is a schematic view showing a seventh embodiment of the invention.

The load measuring apparatus 340 of FIG. 31 may be modified into an apparatus 370 as shown in FIG. 32, in which a plurality of sensing pins 372 are attached to the underside of the measuring member 344, so that the sensing pins 372 rest on the corresponding cushion pins 24 and so that the measuring member 344 is supported via the sensing pins 372. The load values acting on the individual cushion pins 24 are detected by strain gages 374 provided on the sensing pins 372. The sensing pins 372 serve as projections provided on the underside of the measuring member 344, and the strain gages 374 on the pins 372 function as means for detecting the holding force.

While the present invention has been described in detail in its preferred embodiments, it is to be understood that the invention may be otherwise embodied.

For example, the strain gages 116, 118, etc. used in the illustrated embodiments for detecting the holding force may be replaced by other suitable means such as magnetostrictive sensing means for sensing force by utilizing the property of magnetostriction.

While the electromagnetic oscilloscope 122 is used for recording load values detected by the strain gages, other recording means or instrument having high response may be used.

Although the sensing pins 104, 372 are bolted or otherwise attached to the measuring member 106, 344, these pins may be formed as integral parts of the measuring member 106, 344.

In the press 10 of FIG. 1, the die set information stored in the ID card 96 is sent to the controller 90 by means of the transmitter/receiver 94. However, the ID card 96 may be replaced by a bar code, a magnetic tape or a floppy disk. In this case, the die set information in the form of the bar code or stored in the tape or disk is read by a suitable reader connected to the controller 90. Further, the die set information may be manually entered into the controller 90 through a keyboard, for example.

While the press 10 is adapted to automatically determine the initial values of the pneumatic pressures Pa, Pe on the basis of the die set information and the machine information, the load measuring apparatus according to the principle of the present invention for measuring the holding force is equally applicable to a press of the type in which the above initial values are obtained by a try-and-error procedure so as to assure desired formed products.

Although the press 10 uses the common air tank 82 for the four counterbalancing pneumatic cylinders 80, the pneumatic cylinders 80 may be provided with respective air tanks, so that the pressures of the cylinders may be adjusted independently of each other. The present invention is applicable to the press 10 as otherwise modified.

While the press 10 is adapted to determine the pressing conditions such as the pneumatic pressure Pa according to the equations (2) through (5), other equations or data maps may be used to obtain the pressing conditions.

It is to be understood that the present invention may be embodied with various other changes, modifications, and improvements, which may occur to those skilled in the art, without departing from the spirit and scope of the invention defined in the accompanying drawings.

What is claimed is:

1. An apparatus for measuring a holding force expected to act on a pressure member for holding a blank to be drawn on a pressing machine which includes (a) a stationary bolster on which a lower die is fixed, (b) a movable main slide which carries an upper die fixed thereto and below which said pressure member is disposed, (d) a plurality of cushion pins which extend through said bolster and support at their upper ends said pressure member such that said cushion pins and said pressure member are movable in the longitudinal direction of said cushion pins, (e) a cushion pad associated with the lower ends of said cushion pins to move the cushion pins, (f) force applying means for applying the holding force to said pressure member, said force applying means having a fluid-actuated cylinder with a piston actuated by a fluid pressure for biasing said cushion pad upwards in the longitudinal direction of the cushion pins, wherein when said main slide is lowered towards said bolster, a force is transmitted to said cushion pad via said pressure member and said cushion pins, whereby said cushion pad is forced to be lowered, with a result of a retracting movement of said piston, which causes an increase in the fluid pressure within said fluid-actuated cylinder, thereby said holding force corresponding to the increased fluid pressure is applied to said pressure member, to hold said blank, said apparatus being operated to measure said holding force, before said lower and upper dies and said pressure member are installed on said pressing machine, said apparatus comprising:

a measuring member to be placed on said cushion pins;

at least one sensing element to be disposed on one of said measuring member and said main slide, such that said holding force produced by said force applying means acts on said at least one sensing element, when said measuring member is lowered with said at least one sensing element in pressing contact with said main slide and said measuring member as said main slide is lowered towards said bolster;

load detecting means provided on said at least one sensing element, for detecting said holding force acting on said at least one sensing element, to thereby detect said holding force expected to be applied to said pressure member during an operation of said pressing machine; and recording means for recording said holding force as detected by said load detecting means.

2. An apparatus according to claim 1, wherein said at least one sensing element consists of a plurality of sensing elements.

3. An apparatus according to claim 1, wherein said at least one sensing element is provided on an upper surface of said measuring member which faces said main slide when said measuring member is placed on said cushion pins.

4. An apparatus according to claim 1, wherein said at least one sensing element is provided on a lower surface of said main slide which faces said measuring member placed on said cushion pins.

5. An apparatus according to claim 4, further comprising a holder plate to be secured to said main slide, said at least one sensing element being fixed to said holder plate.

6. An apparatus according to claim 1, wherein said measuring member has a plurality of projections provided on an underside thereof so that said measuring member is supported by said cushion pins via said projections, so that said holding force produced by said force applying means acts on said projections, when said cushion pins are lowered with said projections in pressing contact with said cushion pins, and with said at least one sensing element in pressing contact with said main slide as said main slide is lowered towards said bolster, said apparatus further comprising:

load detecting means provided on said plurality of projections, for detecting said holding force acting on said projections, to thereby detect said holding force expected to be applied to said pressure member during an operation of the pressing machine; and recording means for recording said holding force as detected by said load detecting means.

7. An apparatus according to claim 1, further comprising a positioning member to be placed on said bolster such that said cushion pins extend through said positioning member, said positioning member accommodating said measuring member.

8. An apparatus according to claim 7, wherein said positioning member has a plurality of guides for sliding engagement with a periphery of said measuring member to guide said measuring member in a longitudinal direction of said cushion pins, and to position said measuring member in a plane perpendicular to said longitudinal direction.

9. An apparatus according to claim 7, wherein said positioning member has a plurality of sensing posts located for abutting contact with an outer slide of a double-action press different from said pressing machine as a single-action press, said double-action press including a pressure ring lowered with said outer slide to hold said blank, an inner slide carrying an upper die, and a stationary lower die which cooperates with said upper die to perform a pressing operation on the blank on said double-action press, each of said sensing posts being provided with load detecting means for detecting a holding force which acts on said sensing posts when said outer slide is lowered, whereby said apparatus is capable of detecting the holding force expected to act on aid pressure ring on said double-action press, as well as the holding force expected to act on said pressure member of said single-action press as said pressing machine.

10. An apparatus according to claim 1, further comprising a plurality of guide pins which extend through said bolster and slidably engage said measuring member for guiding said measuring member in a longitudinal direction of said cushion pins and positioning said measuring member in a plane perpendicular to said longitudinal direction.

11. An apparatus for measuring a holding force expected to act on a pressure member for holding a blank to be drawn on a pressing machine which includes (a) a stationary bolster on which a lower die is fixed, (b) a movable main slide which carries an upper die fixed thereto and below which said pressure member is disposed, (d) a plurality of cushion pins which extend through said bolster and support at their upper ends said pressure member such that said cushion pins and said pressure member are movable in the longitudinal direction of said cushion pins, (e) a cushion pad associated with the lower ends of said cushion pins to move the cushion pins, (f) force applying means for applying the holding force to said pressure member, said force applying means having a fluid-actuated cylinder with a piston actuated by a fluid pressure for biasing said cushion pad upwards in the longitudinal direction of the cushion pins, wherein when said main slide is lowered towards said bolster, a force is transmitted to said cushion pad via said pressure member and said cushion pins, whereby said cushion pad is forced to be lowered, with a result of a retracting movement of said piston, which causes an increase in the fluid pressure within said fluid-actuated cylinder, thereby said holding force corresponding to the increased fluid pressure is applied to said pressure member, to hold said blank, said apparatus being operated to measure said holding force, before said lower and upper dies and said pressure member are installed on said pressing machine, said apparatus comprising:

a measuring member to be placed on said cushion pins, said measuring member having a plurality of projections provided on an underside thereof so that said measuring member is supported at said projections by said cushion pins and so that said holding force produced by said force applying means acts on said projections, when said cushion pins are lowered with said projections in pressing contact with said cushion pins, and with said measuring member in pressing contact with said main slide as said main slide is lowered towards said bolster;

load detecting means provided on said plurality of projections, for detecting said holding force acting on said projections, to thereby detect said holding force expected to be applied to said pressure member during an operation of the pressing machine; and recording means for recording said holding force as detected by said load detecting means.

12. An apparatus according to claim 11, wherein said load detecting means consists of a plurality of sets of strain gages each set provided on each of said projections.

13. An apparatus according to claim 11, further comprising:

at least one sensing element to be disposed on one of said measuring member and said main slide, such that said holding force produced by said force applying means also acts on said at least one sensing element, when said measuring member is lowered with said at least one sensing element in pressing contact with said main slide and said measuring member as said main slide is lowered towards said bolster;

second load detecting means provided on said at least one sensing element, for detecting said holding force acting on said at least one sensing element, to thereby detect said holding force expected to be applied to said pressure member during an operation of said pressing machine; and second recording means for recording said holding force as detected by said second load detecting means.

14. An apparatus according to any one of claims 11-13, further comprising a positioning member to be placed on said bolster such that said cushion pins extend through said positioning member, said positioning member accommodating said measuring member.

15. An apparatus according to claim 14, wherein said positioning member has a plurality of guides for sliding engagement with a periphery of said measuring member to guide said measuring member in a longitudinal direction of said cushion pins, and to position said measuring member in a plane perpendicular to said longitudinal direction.

* * * * *